(12) United States Patent
Haga et al.

(10) Patent No.: US 11,546,363 B2
(45) Date of Patent: Jan. 3, 2023

(54) ANOMALY DETECTION DEVICE, IN-VEHICLE NETWORK SYSTEM, AND ANOMALY DETECTION METHOD

(71) Applicant: Panasonic Intellectual Property Corporation of America, Torrance, CA (US)

(72) Inventors: Tomoyuki Haga, Nara (JP); Yuishi Torisaki, Osaka (JP); Hiroyasu Terazawa, Osaka (JP); Ryo Kato, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 303 days.

(21) Appl. No.: 16/897,853

(22) Filed: Jun. 10, 2020

(65) Prior Publication Data

US 2020/0304532 A1    Sep. 24, 2020

Related U.S. Application Data

(63) Continuation of application No. PCT/JP2018/044642, filed on Dec. 5, 2018.

(30) Foreign Application Priority Data

Dec. 15, 2017 (JP) .............................. JP2017-240804

(51) Int. Cl.
*H04L 9/40* (2022.01)
*H04L 12/40* (2006.01)
(Continued)

(52) U.S. Cl.
CPC ........ *H04L 63/1425* (2013.01); *B60R 16/023* (2013.01); *G06F 11/3476* (2013.01);
(Continued)

(58) Field of Classification Search
CPC ... H04L 2012/40215; H04L 2012/4026; H04L 2012/40273; H04L 12/40026; H04L 63/14
See application file for complete search history.

(56) References Cited

U.S. PATENT DOCUMENTS

2008/0123622 A1   5/2008   Kaganoi et al.
2015/0172298 A1*  6/2015   Otsuka ................... H04L 63/08
                                                726/30
(Continued)

FOREIGN PATENT DOCUMENTS

EP     3113529      *  1/2017  ......... H04L 63/1441
JP     2007-288711     11/2007
(Continued)

OTHER PUBLICATIONS

International SearchReport (ISR) dated Mar. 5, 2019 in International (PCT) Application No. PCT/JP2018/044642.
(Continued)

*Primary Examiner* — Kent Krueger
(74) *Attorney, Agent, or Firm* — Wenderoth, Lind & Ponack, L.L.P.

(57) ABSTRACT

An anomaly detection device for detecting anomaly in frames flowing through an in-vehicle network system includes: an obtainer that obtains one or more frames; a first holder holding a first rule defining a rule indicating that when a frame satisfies a first condition based on a source or a destination, the frame is to be transferred; a first frame controller that transfers the one or more frames in accordance with the first rule; a second holder holding a second rule defining a rule indicating that a frame satisfying a second condition is to be determined as being anomalous; and a second frame controller that performs, in accordance with the second rule, an anomaly detection process on each of the one or more frames transferred by the first frame controller. When an anomalous frame is detected, the second frame controller provides or stores a detection result.

8 Claims, 14 Drawing Sheets

(51) Int. Cl.
*B60R 16/023* (2006.01)
*G06F 11/34* (2006.01)
*H04L 67/12* (2022.01)

(52) U.S. Cl.
CPC .............. *H04L 12/40* (2013.01); *H04L 67/12* (2013.01); *H04L 2012/40215* (2013.01); *H04L 2012/40273* (2013.01)

(56) References Cited

U.S. PATENT DOCUMENTS

| | | | | |
|---|---|---|---|---|
| 2015/0358351 | A1* | 12/2015 | Otsuka | H04L 12/4625 |
| | | | | 726/23 |
| 2016/0255154 | A1* | 9/2016 | Kim | H04L 63/08 |
| | | | | 726/25 |
| 2017/0093866 | A1* | 3/2017 | Ben-Noon | H04W 12/069 |
| 2017/0147812 | A1 | 5/2017 | Ujiie et al. | |
| 2019/0253272 | A1* | 8/2019 | Kolbus | H04L 12/40169 |
| 2019/0394089 | A1* | 12/2019 | Barrett | H04W 12/088 |

FOREIGN PATENT DOCUMENTS

| | | |
|---|---|---|
| JP | 2008-85819 | 4/2008 |
| JP | 2008-136049 | 6/2008 |
| JP | 2011-188276 | 9/2011 |
| JP | 2012-6446 | 1/2012 |
| JP | 2016-134914 | 7/2016 |

OTHER PUBLICATIONS

International Preliminary Report on Patentability (IPRP) dated Oct. 21, 2019 in International (PCT) Application No. PCT/JP2018/044642.

* cited by examiner

FIG. 6

| | SECURITY RULE {401} | | | | | | DISTRIBUTED DETECTION RULE {402} | | |
|---|---|---|---|---|---|---|---|---|---|
| INPUT PORT | SOURCE IP | SOURCE MAC | OUTPUT PORT | DESTINATION IP | DESTINATION MAC | FLOW RATE | RATE OF TRANSFER TO SECOND FRAME CONTROLLER | DESTINATIONS OF DISTRIBUTED DETECTION | DISTRIBUTED DETECTION |
| 1 | CAMERA | CAMERA | 4 | AUTONOMOUS DRIVING ECU | AUTONOMOUS DRIVING ECU | 8 Mbps ≤ F ≤ 10 Mbps | 1/3 | ETHERNET SWITCH B | 1/3 |
| | | | | | | | | ETHERNET SWITCH C | 1/3 |
| 2 | LIDAR | LIDAR | 4 | AUTONOMOUS DRIVING ECU | AUTONOMOUS DRIVING ECU | 8 Mbps ≤ F ≤ 12 Mbps | 1/3 | ETHERNET SWITCH B | 1/3 |
| | | | | | | | | ETHERNET SWITCH C | 1/3 |
| 3 | DYNAMIC MAP ECU | DYNAMIC MAP ECU | 4 | AUTONOMOUS DRIVING ECU | AUTONOMOUS DRIVING ECU | 10 Mbps ≤ F ≤ 30 Mbps | 1/2 | ETHERNET-CAN SWITCH C | 1/2 |

| | SECURITY RULE 501 | | | | | PAYLOAD RULE 502 | | |
|---|---|---|---|---|---|---|---|---|
| INPUT PORT | SOURCE IP | SOURCE MAC | OUTPUT PORT | DESTINATION IP | DESTINATION MAC | FLOW RATE | DATA FORMAT CHECK | DATA VARIATION CHECK | DATA RANGE CHECK |
| 1 | CAMERA | CAMERA | 4 | AUTONOMOUS DRIVING ECU | AUTONOMOUS DRIVING ECU | 8 Mbps ≤ F ≤ 10 Mbps | START POSITION, SIZE, EXPECTED VALUE | START POSITION, SIZE, EXPECTED VARIATION VALUE | START POSITION, SIZE, ALLOWED RANGE |
| 2 | LIDAR | LIDAR | 4 | AUTONOMOUS DRIVING ECU | AUTONOMOUS DRIVING ECU | 8 Mbps ≤ F ≤ 12 Mbps | START POSITION, SIZE, EXPECTED VALUE | START POSITION, SIZE, EXPECTED VARIATION VALUE | START POSITION, SIZE, ALLOWED RANGE |
| 3 | DYNAMIC MAP ECU | DYNAMIC MAP ECU | 4 | AUTONOMOUS DRIVING ECU | AUTONOMOUS DRIVING ECU | 10 Mbps ≤ F ≤ 30 Mbps | START POSITION, SIZE, EXPECTED VALUE | START POSITION, SIZE, EXPECTED VARIATION VALUE | START POSITION, SIZE, ALLOWED RANGE |

(500)

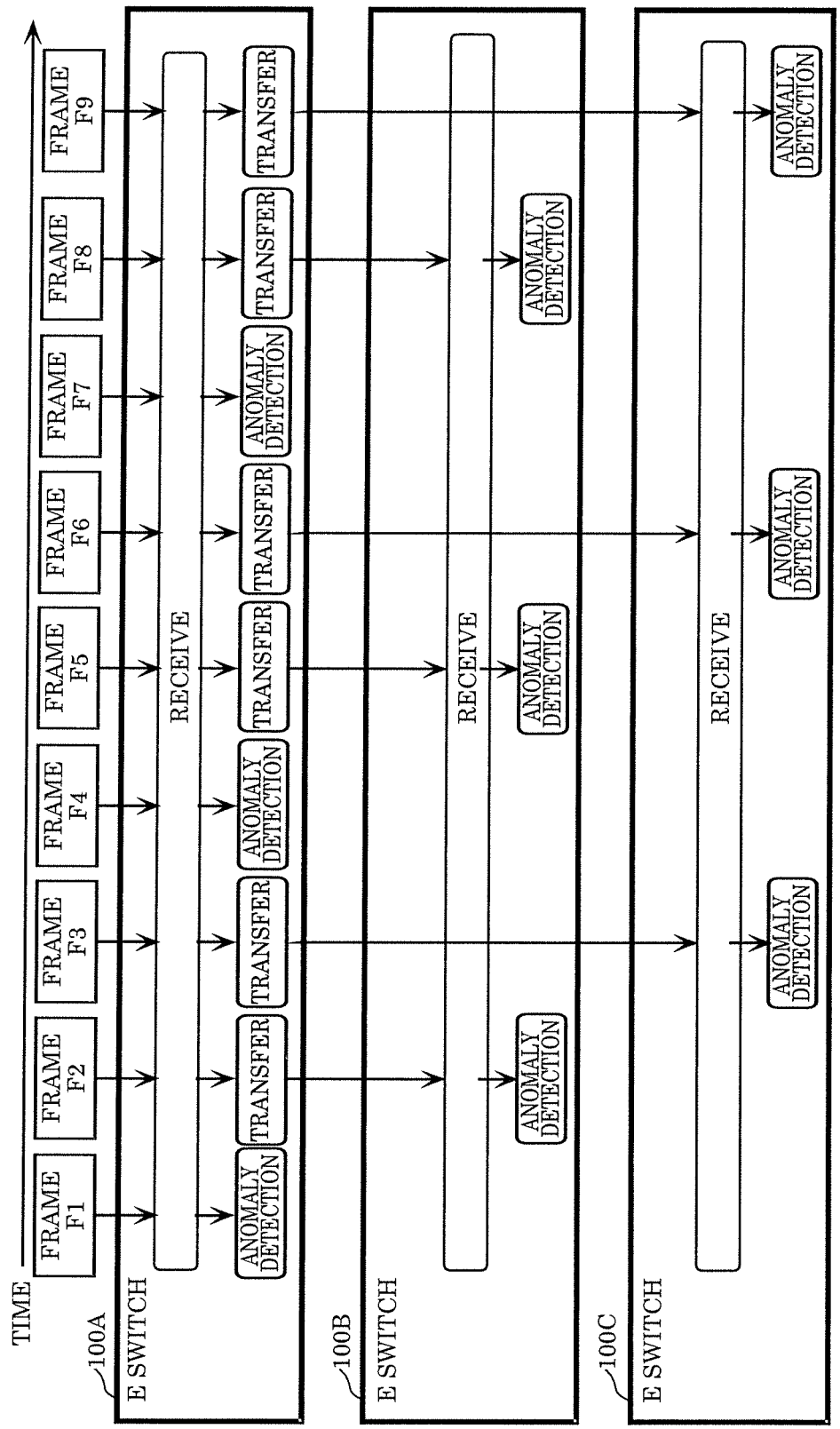

FIG. 10

| FLOW IDENTIFICATION INFORMATION (START TIME – END TIME) | SOURCE PORT NUMBER | SOURCE IP | SOURCE MAC | OUTPUT PORT NUMBER | DESTINATION IP | DESTINATION MAC | OBSERVED FLOW RATE |
|---|---|---|---|---|---|---|---|
| 8:00 - 8:10 | 50000 | CAMERA | CAMERA | 50001 | AUTONOMOUS DRIVING ECU | AUTONOMOUS DRIVING ECU | 3 Mbps |
| 8:10 - 8:15 | 50000 | CAMERA | CAMERA | 50001 | AUTONOMOUS DRIVING ECU | AUTONOMOUS DRIVING ECU | 2 Mbps |
| 8:15 - 8:20 | 50000 | CAMERA | CAMERA | 50001 | AUTONOMOUS DRIVING ECU | AUTONOMOUS DRIVING ECU | 3 Mbps |
| 8:00 - 8:10 | 60000 | LIDAR | LIDAR | 60001 | AUTONOMOUS DRIVING ECU | AUTONOMOUS DRIVING ECU | 4 Mbps |
| 8:10 - 8:15 | 60000 | LIDAR | LIDAR | 60001 | AUTONOMOUS DRIVING ECU | AUTONOMOUS DRIVING ECU | 4 Mbps |
| 8:15 - 8:20 | 60000 | LIDAR | LIDAR | 60001 | AUTONOMOUS DRIVING ECU | AUTONOMOUS DRIVING ECU | 4 Mbps |
| 8:00 - 8:10 | 70000 | LIDAR | LIDAR | 70001 | AUTONOMOUS DRIVING ECU | AUTONOMOUS DRIVING ECU | 20 Mbps |
| 8:10 - 8:15 | 70000 | LIDAR | LIDAR | 70001 | AUTONOMOUS DRIVING ECU | AUTONOMOUS DRIVING ECU | 15 Mbps |
| 8:15 - 8:20 | 70000 | LIDAR | LIDAR | 70001 | AUTONOMOUS DRIVING ECU | AUTONOMOUS DRIVING ECU | 10 Mbps |

| FLOW IDENTIFICATION INFORMATION (START TIME – END TIME) | SOURCE PORT NUMBER | SOURCE IP | SOURCE MAC | OUTPUT PORT NUMBER | DESTINATION IP | DESTINATION MAC | OBSERVED FLOW RATE |
|---|---|---|---|---|---|---|---|
| 8:00 - 8:05 | 50000 | CAMERA | CAMERA | 50001 | AUTONOMOUS DRIVING ECU | AUTONOMOUS DRIVING ECU | 9 Mbps |
| 8:05 - 8:10 | 50000 | CAMERA | CAMERA | 50001 | AUTONOMOUS DRIVING ECU | AUTONOMOUS DRIVING ECU | 6 Mbps |
| 8:10 - 8:15 | 50000 | CAMERA | CAMERA | 50001 | AUTONOMOUS DRIVING ECU | AUTONOMOUS DRIVING ECU | 11 Mbps |
| 8:00 - 8:05 | 60000 | LIDAR | LIDAR | 60001 | AUTONOMOUS DRIVING ECU | AUTONOMOUS DRIVING ECU | 12 Mbps |
| 8:05 - 8:10 | 60000 | LIDAR | LIDAR | 60001 | AUTONOMOUS DRIVING ECU | AUTONOMOUS DRIVING ECU | 12 Mbps |
| 8:10 - 8:15 | 60000 | LIDAR | LIDAR | 60001 | AUTONOMOUS DRIVING ECU | AUTONOMOUS DRIVING ECU | 12 Mbps |
| 8:00 - 8:05 | 70000 | DYNAMIC MAP | DYNAMIC MAP | 70001 | AUTONOMOUS DRIVING ECU | AUTONOMOUS DRIVING ECU | 40 Mbps |
| 8:05 - 8:10 | 70000 | DYNAMIC MAP | DYNAMIC MAP | 70001 | AUTONOMOUS DRIVING ECU | AUTONOMOUS DRIVING ECU | 30 Mbps |
| 8:10 - 8:15 | 70000 | DYNAMIC MAP | DYNAMIC MAP | 70001 | AUTONOMOUS DRIVING ECU | AUTONOMOUS DRIVING ECU | 20 Mbps |

710

# ANOMALY DETECTION DEVICE, IN-VEHICLE NETWORK SYSTEM, AND ANOMALY DETECTION METHOD

CROSS REFERENCE TO RELATED APPLICATIONS

This application is a U.S. continuation application of PCT International Patent Application Number PCT/JP2018/044642 filed on Dec. 5, 2018 claiming the benefit of priority of Japanese Patent Application Number 2017-240804 filed on Dec. 15, 2017, the entire contents of which are hereby incorporated by reference.

BACKGROUND

1. Technical Field

The present disclosure relates to an anomaly detection device which detects an anomalous message in an in-vehicle network, an in-vehicle network system, and an anomaly detection method.

2. Description of the Related Art

Japanese Unexamined Patent Application Publication No. 2012-006446 discloses an in-vehicle network system for controlling a vehicle.

SUMMARY

However, the technique in the aforementioned patent literature requires further improvement.

An anomaly detection device according to one aspect of the present disclosure detects anomaly in a frame flowing through an in-vehicle network system in a vehicle and includes: an obtainer that obtains one or more frames in each of which at least one of a source and a destination is stored; a first holder that holds a first rule defining a rule indicating that when a frame included in the one or more frames satisfies a first condition based on one of the source and the destination, the frame is to be transferred or mirrored; a first frame controller that controls transferring or mirroring of the one or more frames in accordance with the first rule; a second holder that holds a second rule defining a rule indicating that a frame satisfying a second condition is to be determined as being anomalous; and a second frame controller that performs, in accordance with the second rule, an anomaly detection process on each of the one or more frames transferred or mirrored by the first frame controller. When an anomalous frame is detected, the second frame controller provides or stores a detection result indicating the anomalous frame detected.

Note that these general and specific aspects may be implemented using a system, a method, an integrated circuit, a computer program, or a computer-readable recording medium such as a compact disc read-only memory (CD-ROM), or any combination of systems, methods, integrated circuits, computer programs, and recording media.

With the present disclosure, further improvement can be made.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 is a diagram illustrating one example of a first rule held by a first holder;

FIG. 7 is a diagram illustrating one example of a second rule held by a second holder;

FIG. 8 is a diagram outlining the processing for distributing E frames and detecting anomaly;

FIG. 10 is a diagram illustrating one example of flow information held by a third holder;

FIG. 12 is a diagram illustrating one example of integrated log information generated by an integrated log manager;

DETAILED DESCRIPTION OF THE EMBODIMENTS

Figure 1:
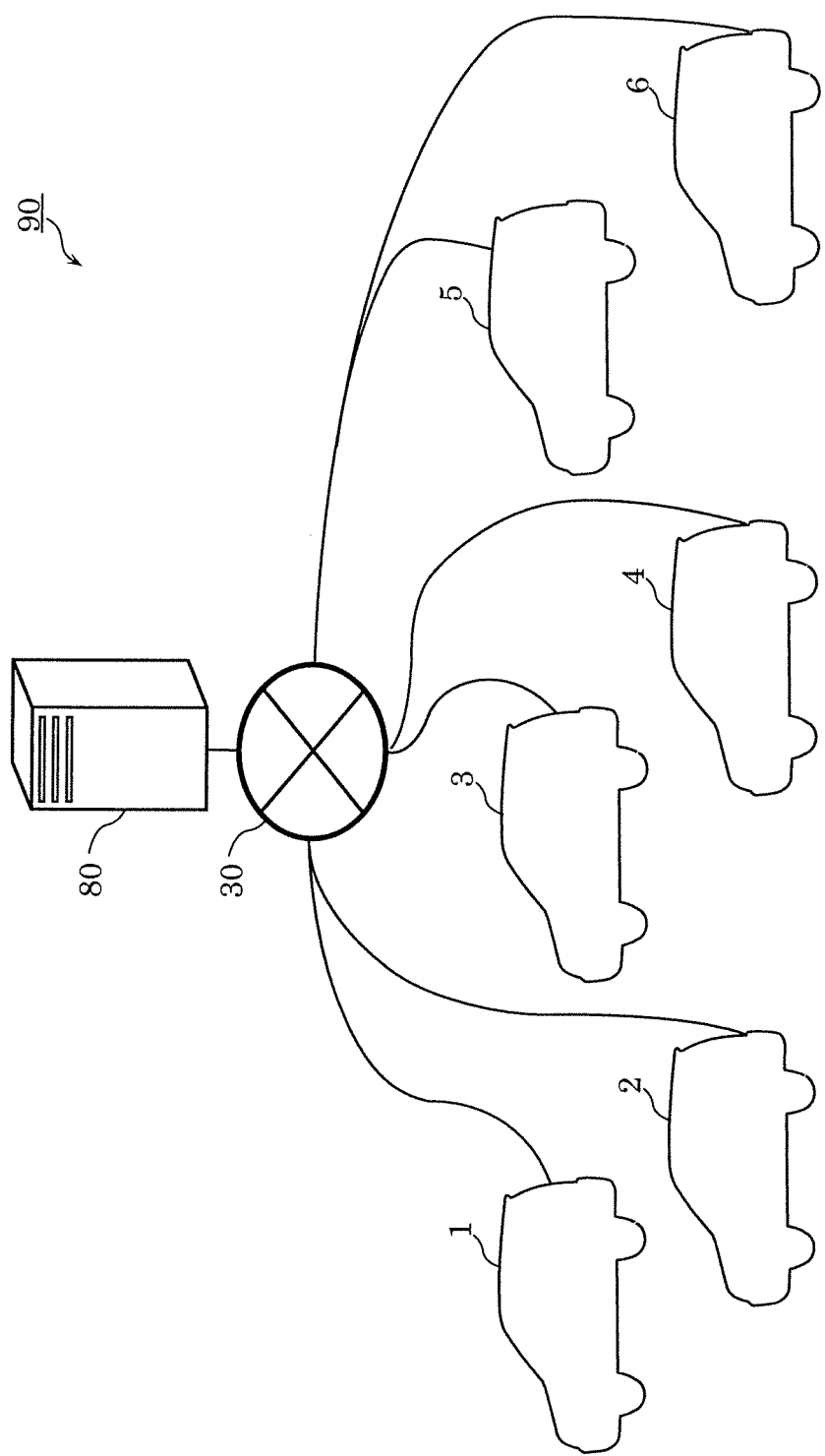
FIG. 1 is a diagram illustrating one example of the overall configuration of an in-vehicle network detection system according to an embodiment.

Underlying Knowledge Forming Basis of the Present Disclosure

In relation to the in-vehicle network system described in the BACKGROUND ART section, the inventors have found the problem indicated below.

In recent years, multiple devices called electronic control units (ECUs) are disposed in a system in an automobile. A network connecting these ECUs is referred to as an in-vehicle network. There are many standards for the in-vehicle network. One of the most dominant in-vehicle networks is the controller area network (CAN) defined in the ISO 11898-1. Furthermore, as a standard for transmitting more information, there is a standard called Ethernet (registered trademark) defined in the IEEE 802.3.

In the advanced driver-assistance systems and the self-driving technology, there is a need to process a vast amount of information such as data obtained by sensors such as cameras and light detection and ranging (LIDAR) devices and data to be used for dynamic maps, and thus Ethernet (registered trademark) achieving a high data transmission rate is being introduced. Meanwhile, the existing CAN is also used as a vehicle control system. Therefore, more and more in-vehicle network architectures use both the CAN and the Ethernet.

Automobiles are connected to external networks and increasingly computerized. This exposes the automobiles to the risks of anomalous operations involving automobile control system command spoofing. In order to provide protection from such risks, Japanese Unexamined Patent Application Publication No. 2012-006446 discloses determining whether to transfer data transmitted to an information network represented by the Ethernet, from the information network to a vehicle control network represented by the CAN. However, Japanese Unexamined Patent Application Publication No. 2012-006446 fails to disclose packet inspection for detecting an anomaly by checking the content of a frame included in data.

In architectures into which an in-vehicle Ethernet is introduced, Ethernet switches are used for connection to various devices supporting the Ethernet. The Ethernet switches are capable of high-speed security processes using hardware such as TCAM, which stands for ternary content addressable memory (CAM). However, there is a limit on security rules that can be set in the security processes performed by the Ethernet switches. Therefore, in order to set a flexibly security rule like packet inspection, it is possible to additionally apply software processes using microprocessor units (MPUs) to provide a packet inspection function. However, the resource of MPUs mounted on the Ethernet switches is limited, and thus it is difficult to perform, through the software processes using the MPUs, packet inspection on all the Ethernet frames received by the Ethernet switches.

Thus, the inventors diligently studied and found, as an anomaly detection process including a packet inspection function for Ethernet frames, a process in which resources of other Ethernet switches are also used so that anomaly detection processes for frames are distributed. This enables other devices to detect a frame that cannot be detected in packet inspection in a software process using a MPU of a single Ethernet switch. Thus, the present disclosure aims to improve an anomaly detection check rate for Ethernet frames and detect an attack on a vehicle early on to prevent unauthorized control of the vehicle.

An anomaly detection device according to one aspect of the present disclosure detects anomaly in a frame flowing through an in-vehicle network system in a vehicle and includes: an obtainer that obtains one or more frames in each of which at least one of a source and a destination is stored; a first holder that holds a first rule defining a rule indicating that when a frame included in the one or more frames satisfies a first condition based on one of the source and the destination, the frame is to be transferred or mirrored; a first frame controller that controls transferring or mirroring of the one or more frames in accordance with the first rule; a second holder that holds a second rule defining a rule indicating that a frame satisfying a second condition is to be determined as being anomalous; and a second frame controller that performs, in accordance with the second rule, an anomaly detection process on each of the one or more frames transferred or mirrored by the first frame controller. When an anomalous frame is detected, the second frame controller provides or stores a detection result indicating the anomalous frame detected.

With this, the anomaly detection device can perform the anomaly detection process on one or more frames flowing through the in-vehicle network, in two stages in accordance with the first rule and the second rule. The anomaly detection device transfers or mirrors a frame satisfying the first condition based on one of the source and the destination in accordance with the first rule and determines, in accordance with the second rule, whether the frame selected in accordance with the first rule is anomalous. Therefore, the number of frames subject to the anomaly detection process can be set small in such a manner that the accuracy of detecting anomaly is not reduced, and thus it is possible to reduce the processing load in anomaly detection in which the second rule is used. Consequently, it is possible to effectively detect anomaly.

Furthermore, the first frame controller may be implemented by hardware, and the second frame controller may be implemented by software.

With this, a processing function using the first rule is implemented through hardware, and thus processing using the first rule can be performed at high speed. Furthermore, a processing function using the second rule is implemented through software, and thus the definition of the second rule can be flexibly changed using the software. This makes it possible to easily set a flexible security rule like packet inspection, for example.

Furthermore, the obtainer may obtain a plurality of frames including the one or more frames, the first rule may define a rule indicating that among the plurality of frames obtained by the obtainer, frames accounting for a first proportion are to be transferred or mirrored to the second frame controller, and frames accounting for a second proportion are to be transferred or mirrored to another anomaly detection device in the vehicle, the first frame controller may transfer or mirror the frames accounting for the first proportion to the second frame controller and transfer or mirror the frames accounting for the second proportion to the other anomaly detection device in accordance with the first rule, and the second frame controller may perform, in accordance with the second rule, the anomaly detection process on each of the frames transferred or mirrored by the first frame controller that account for the first proportion.

Furthermore, when transferring or mirroring the frames accounting for the second proportion to the other anomaly detection device, the first frame controller may transmit request information to the other anomaly detection device by adding, to the frames accounting for the second proportion, the request information indicating that the first frame controller requests the other anomaly detection device to perform the anomaly detection process on each of the frames accounting for the second proportion.

With this, for example, the coordination with another anomaly detection device connected to the in-vehicle network such as the Ethernet allows distributed processing of frame anomaly detection with the other anomaly detection device. Thus, it is possible to reduce the processing load in anomaly detection on each anomaly detection device, allowing more frames to be subject to the anomaly detection process.

Furthermore, a domain of the in-vehicle network system may be divided into a plurality of domains, the anomaly detection device and the other anomaly detection device may belong to different domains among the plurality of domains, and when transferring or mirroring the frames to the other anomaly detection device, the first frame controller may add, to the frames, identification information for identifying a domain to which the other anomaly detection device belongs, or rewrite identification information included in the frames into the identification information for identifying the domain to which the other anomaly detection device belongs, and transfer or mirror the frames.

With this, for example, also in an in-vehicle network divided into domains using a tag virtual local area network (VLAN), the frame anomaly detection can be distributed to and processed by a plurality of anomaly detection devices belonging to different domains.

Furthermore, the anomaly detection device may further include: a third holder, and the second frame controller may generate, for each pair of the source and the destination stored in each of the one or more frames obtained by the obtainer, log information about transmission and reception of the frame, and store, into the third holder, the log information generated.

With this, it is possible to monitor the tendency of flowing frames such as the type, the source, the destination, and the flow rate of one or more frames flowing through the in-vehicle network.

Furthermore, the anomaly detection device may further include: an integrated log manager that obtains one or more pieces of the log information from one or more other anomaly detection devices in the vehicle, generates integrated log information by integrating the one or more pieces of the log information obtained and the log information stored in the third holder, and stores, into the third holder, the integrated log information generated.

With this, in the case where the anomaly detection processes are distributed to a plurality of anomaly detection devices, the results of anomaly detection by the respective anomaly detection devices are integrated. Thus, it is possible to monitor the tendency of flowing frames such as the type, the source, the destination, and the flow rate of one or more frames flowing through the in-vehicle network in the whole vehicle.

Furthermore, an anomaly detection device according to one aspect of the present disclosure includes: a plurality of anomaly detection devices; and an integrated log management device that obtains one or more pieces of the log information from each of the plurality of anomaly detection devices, generates integrated log information by integrating the one or more pieces of the log information respectively obtained from the plurality of anomaly detection devices, and stores the integrated log information generated.

With this, in the case where the anomaly detection processes are distributed to a plurality of anomaly detection devices, the results of anomaly detection by the respective anomaly detection devices are integrated. Thus, it is possible to monitor the tendency of flowing frames such as the type, the source, the destination, and the flow rate of one or more frames flowing through the in-vehicle network in the whole vehicle.

Note that these general and specific aspects may be implemented using a system, a method, an integrated circuit, a computer program, or a computer-readable recording medium such as a CD-ROM, or any combination of systems, methods, integrated circuits, computer programs, and recording media.

Hereinafter, an anomaly detection device and an anomaly detection method according to an embodiment will be described with reference to the Drawings. Each embodiment described below shows a specific example of the present disclosure. The numerical values, structural elements, and the arrangement and connection of the structural elements, steps as elements in processing, the processing order of the steps, etc., shown in the following embodiment are mere examples, and are not intended to limit the present disclosure. Among the structural elements in the following embodiment, structural elements not recited in any one of the independent claims are elements that are arbitrarily included. Note that the figures are schematic diagrams and are not necessarily precise illustrations.

Embodiment

FIG. 1 is a diagram illustrating one example of the overall configuration of an in-vehicle network detection system according to an embodiment.

In-vehicle network system 90 includes monitoring server 80 and vehicles 1 to 6. External network 30 allows connection and communication between monitoring server 80 and each of vehicles 1 to 6. Vehicles 1 to 6 are wirelessly connected to and communicate with external network 30. In-vehicle network system 90 illustrated in FIG. 1 is what is called a connected car system.

Figure 2:
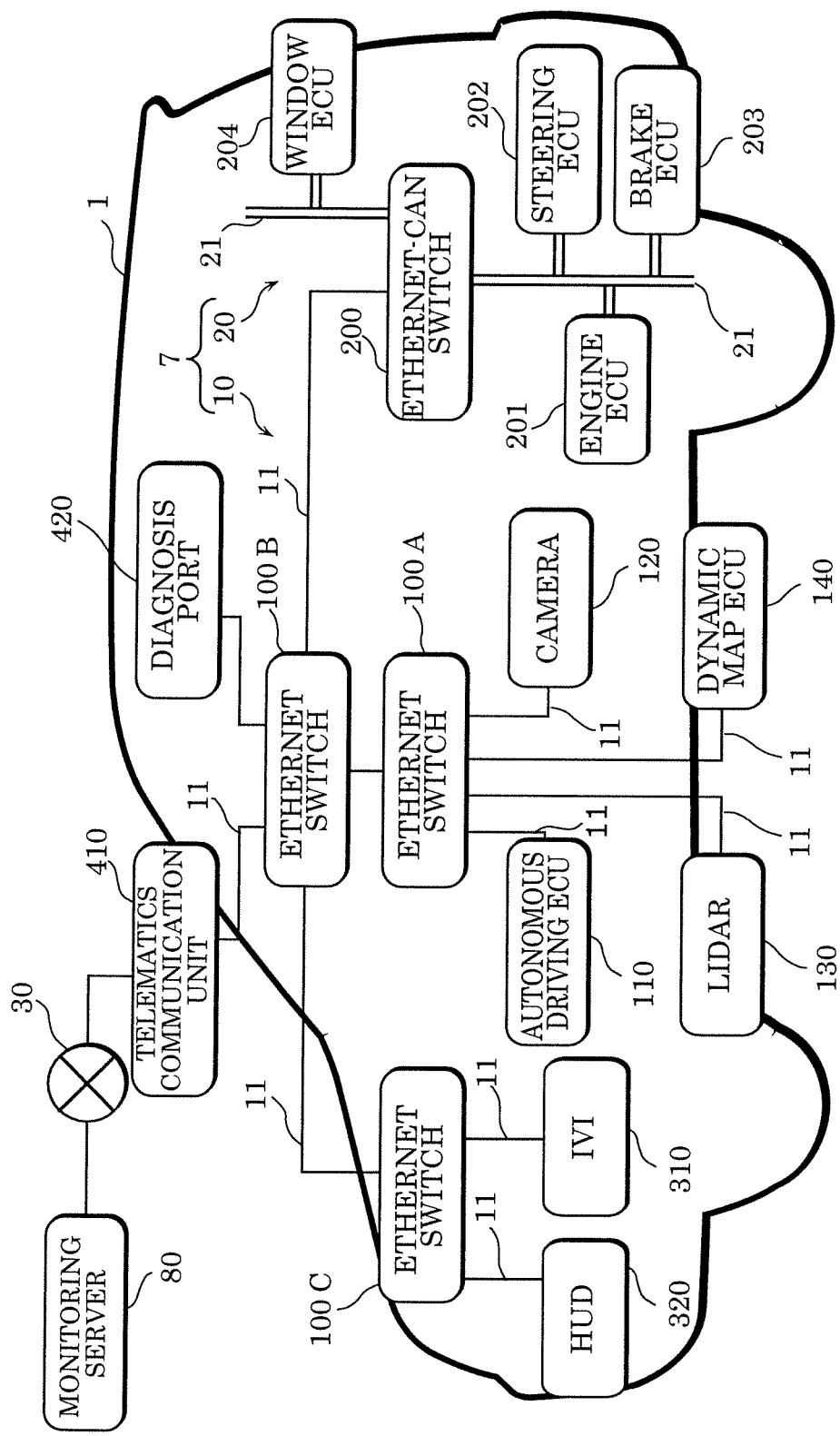
FIG. 2 is a diagram of the overall configuration of an in-vehicle network according to an embodiment.

FIG. 2 is a diagram of the overall configuration of the in-vehicle network according to the present embodiment.

Network system 7 for vehicle 1 is a network communication system in vehicle 1 in which various devices such as a control device, a sensor, an actuator, and a user interface device are installed. Network system 7 includes first network 10 and second network 20. Vehicle 1 is one example of a moving object. First network 10 is an Ethernet (registered trademark) network in which an Ethernet (registered trademark) frame (hereinafter referred to as an "E frame") is transmitted in accordance with an Ethernet (registered trademark) protocol. Second network 20 is a CAN network in which a data frame (CAN frame) or the like is transmitted through a bus in accordance with a CAN protocol.

As illustrated in FIG. 2, network system 7 includes: Ethernet switch 100B (hereinafter referred to as "E switch 100B"); telematics communication unit 410; diagnosis port 420; Ethernet switch 100A (hereinafter referred to as "E switch 100A"); autonomous driving ECU 110; camera 120; LIDAR 130; dynamic map ECU 140; Ethernet switch 100C (hereinafter referred to as "E switch 100C"); in-vehicle infotainment (IVI) 310; head-up display (HUD) 320; Ethernet-CAN switch 200 (hereinafter referred to as "E-CAN switch 200"); engine ECU 201; steering ECU 202; brake ECU 203; window ECU 204; first transmission path 11; and second transmission path 21. First transmission path 11 belongs to first network 10 and is, for example, an Ethernet (registered trademark) cable. Second transmission path 21 belongs to second network 20 and is, for example, a CAN bus.

Note that network system 7 may include one or more ECU or door control unit (DCU) in addition to ECUs 110, 140, 201, 202, 203, 204 described above. For example, other than ECUs 201, 202, 203, 204, an ECU (not illustrated in the drawings) may be connected to second transmission path 21.

Each of ECUs 110, 140, 201, 202, 203, 204 is, for example, a device including a processor (microprocessor), a digital circuit such as memory, an analog circuit, a communication circuit, and the like. The memory is read-only memory (ROM), random-access memory (RAM), or the like and is capable of storing a program (a computer program in the form of software) that is executed by the processor. Examples of the memory may include non-volatile memory. For example, the ECU achieves various functions as a result of the program operating in accordance with the program (computer program). Note that the computer program is configured of a plurality of pieced together instruction codes indicating a command to the processor in order to achieve a given function.

ECUs 201, 202, 203, 204 exchange frames in accordance with the CAN protocol. ECUs 201, 202, 203, 204 are connected to devices, namely, an engine, steering, a brake, and a window opening/closing sensor, respectively, and each obtain the state of the device and, for example, periodically, transmit a data frame indicating the state to second network 20 including second transmission path 21 and the like. Furthermore, each of ECUs 201, 202, 203, 204 receives a data frame from second transmission path 21 included in second network 20, interprets the data frame, and determines whether the data frame includes a CAN-ID to be received.

As a result of the determination, each of ECUs 201, 202, 203, 204 may control the device connected to the ECU in accordance with data (content in a data field) in the data frame as necessary or may generate and transmit a data frame as necessary.

Each of ECUs 110, 140 transmits or receives the E frame in accordance with the Ethernet (registered trademark) protocol. E switch 100C is connected to devices, namely, IVI 310 and HUD 320, and performs processes based on information obtained from these devices. E switch 100A is connected to devices, namely, autonomous driving ECU 110, camera 120, LIDAR 130, and dynamic map ECU 140, and performs processes based on information obtained from these devices.

Telematics communication unit 410, diagnosis port 420, E switch 100A, E-CAN switch 200, and E switch 100C are connected to E switch 100B by first transmission path 11. E switch 100B includes, for example, a processor (e.g., MPU), a digital circuit such as memory, an analog circuit, and a communication circuit.

Telematics communication unit 410 allows vehicle 1 to communicate with monitoring server 80 in external network 30. Telematics communication unit 410 may include a wireless communication interface compatible with a communication standard used in mobile communication systems such as the third generation mobile communication system (3G), the fourth generation mobile communication system (4G), the fifth generation mobile communication system (5G) and the long-term evolution (LTE) (registered trademark) or may include a wireless local area network (LAN) interface compatible with the IEEE802.11a/b/g/n standards, for example. Specifically, external network 30 is a cell phone network, Wi-Fi, or the like. Monitoring server 80 is, for example, a computer having a function, etc., for presenting information to the ECU of vehicle 1.

Diagnosis port 420 is used by a dealer to conduct fault diagnosis on vehicle 1 and is used to transmit and receive commands for diagnosis.

E switch 100A is a switching hub connected to autonomous driving ECU 110, camera 120, LIDAR 130, and dynamic map ECU 140 by first transmission path 11.

Autonomous driving ECU 110 generates a control command for controlling driving of vehicle 1. Specifically, autonomous driving ECU 110 generates control commands for controlling, for example, steering which steers wheels, an engine which rotates and drives the wheels, a power source such as a motor, and a brake which stops the wheels. In other words, the control commands are used to cause vehicle 1 to execute at least one of the following: proceeding (i.e., traveling); turning; and stopping. Autonomous driving ECU 110 transmits the generated control commands to second network 20.

Camera 120 captures an image of the outside, that is, the surroundings of vehicle 1. Camera 120 may be installed, for example, on the exterior body of vehicle 1.

LIDAR 130 is a sensor for sensing an obstacle outside the vehicle. For example, LIDAR 130 is a laser sensor that measures the distance to an object located in the sensing range in any horizontal direction within 360 degrees and in a vertical direction within a predetermined angle (e.g., 30 degrees) from vehicle 1. LIDAR 130 emits laser beams to the surrounding area of vehicle 1 and senses the laser beams reflected by a nearby object, thereby measuring the distance between LIDAR 130 and the object.

Dynamic map ECU 140 is an electronic control unit that receives data to be used for a dynamic map and decodes the dynamic map using the received data. The decoded dynamic map is used, for example, in the autonomous driving control of autonomous driving ECU 110.

E-CAN switch 200 is a switching hub connected to second network 20 and first network 10. In the present embodiment, second network 20 includes the following two CAN buses: a control bus for engine ECU 201, steering ECU 202, and brake ECU 203; and a body bus to which window ECU 204 for controlling opening and closing of windows is connected. E-CAN switch 200 includes, for example, a processor (e.g., MPU), a digital circuit such as memory, an analog circuit, and a communication circuit. E-CAN switch 200 has a function of transferring (or relaying) a frame received from one of two transmission paths 11, 21 to the other transmission path. The transfer of a frame by E-CAN switch 200 is relaying of data related to the frame. Upon the transfer of a frame, at E-CAN switch 200, the communication method, the frame format, and the like may be converted into those complying with the communication protocol used in the transmission path to which the frame is transferred. Furthermore, as the transfer of a frame between the transmission paths, E-CAN switch 200 may transmit one or more frames received from one or more transmission paths, respectively, to one or more transmission paths.

E switch 100C is a switching hub connected to IVI 310 and HUD 320 by first transmission path 11. IVI 310 is a device including a display and having multimedia functions of playing video, audio, etc. HUD 320 is a device that projects video onto a projection surface in front of a driver of vehicle 1, for example. The projection surface may be a surface of the windshield of vehicle 1 or may be a dedicated projection surface different from the windshield.

Note that each of E switches 100A to 100C and E-CAN switch 200 is one example of the anomaly detection device.

Note that although E switch 100A, E switch 100C, and E-CAN switch 200 are connected to one another via E switch 100B through the Ethernet in FIG. 2, the connection configuration is not limited to the illustrated one; other connection configurations such as a ring structure and a double-layered structure may be used to connect these switches to one another.

Figure 3:
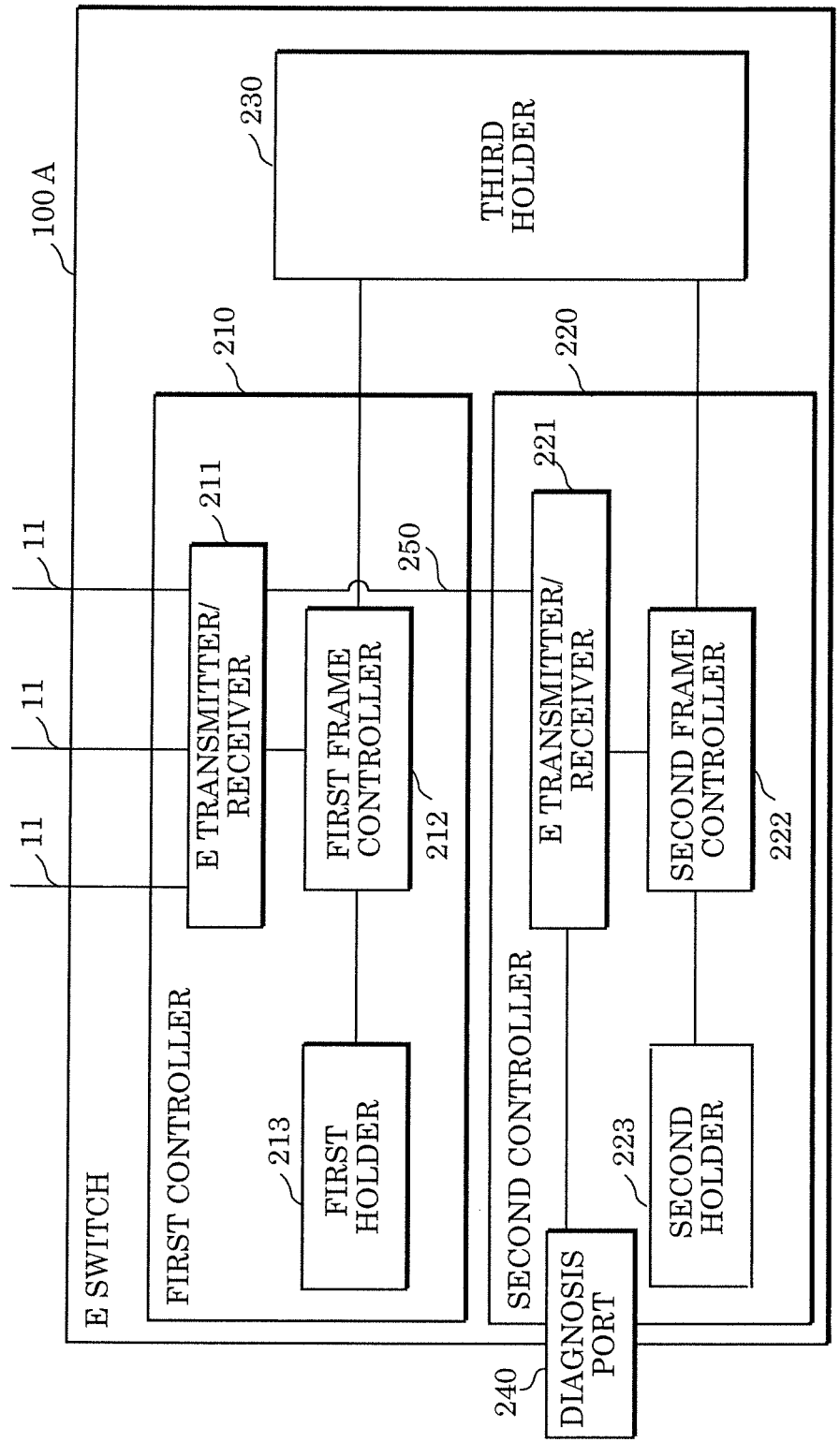
FIG. 3 is a block diagram illustrating one example of the functional configuration of an E switch.

FIG. 3 is a block diagram illustrating one example of the functional configuration of E switch 100A.

E switch 100A includes first controller 210 and second controller 220. E switch 100A may further include third holder 230.

First controller 210 includes Ethernet transmitter/receiver 211 (hereinafter referred to as "E transmitter/receiver 211"), first frame controller 212, and first holder 213.

E transmitter/receiver 211 receives a plurality of E frames from first transmission path 11. Furthermore, E transmitter/receiver 211 transmits an E frame to first transmission path 11. E transmitter/receiver 211 is one example of the obtainer which obtains a plurality of E frames. Note that E transmitter/receiver 211 may receive a single E frame from first transmission path 11.

First holder 213 holds an E frame transfer rule and a security rule about E frame anomaly detection. In other words, first holder 213 holds a first rule defining a rule indicating that when an E frame satisfies a first condition based on one of the source and the destination, the E frame is to be transferred or mirrored.

In accordance with the first rule, first frame controller 212 controls the transfer or the mirroring of the plurality of E frames received by E transmitter/receiver 211. Note that in accordance with the first rule, first frame first frame controller 212 may discard the plurality of E frames received by E transmitter/receiver 211.

Specifically, for each of the plurality of E frames received by E transmitter/receiver 211, first frame controller 212 determines whether the E frame satisfies the first condition defined in the first rule. Furthermore, when the E frame is determined as satisfying the first condition, first frame controller 212 transfers or mirrors the E frame to second controller 220. In contrast, when the E frame is determined as not satisfying the first condition, first frame controller 212 discards the E frame instead of transferring or mirroring the E frame.

First controller 210 is obtained by hardware implementation on Ethernet switch IC. In other words, first frame controller 212 is a processor implemented by hardware. First holder 213 is, for example, TCAM. This means that the first rule is, for example, a rule held in the TCAM. First frame controller 212 preforms a comparison process using the first rule held in the TCAM. The use of the TCAM allows first controller 210 to perform, at high speed, the anomaly detection through packet inspection on a header region or a payload region of the E frame. Furthermore, first controller 210 can perform transfer control including flow rate control, a port VLAN, a tag VLAN, a transfer process, a mirroring process, and sampling transfer.

Second controller 220 includes Ethernet transmitter/receiver 221 (hereinafter referred to as "E transmitter/receiver 221"), second frame controller 222, and second holder 223.

E transmitter/receiver 221 receives the E frame transferred or mirrored by first controller 210. Furthermore, E transmitter/receiver 221 may transmit the E frame to diagnosis port 420. Note that E transmitter/receiver 221 may receive a single E frame from first controller 210.

Second holder 223 holds a transfer rule for the E frames and a security rule about the anomaly detection for the E frames. In other words, second holder 223 holds a second rule defining a rule indicating that an E frame satisfying a second condition is to be determined as being anomalous.

In accordance with the second rule, second frame controller 222 performs the anomaly detection process on each of the plurality of E frames received by E transmitter/receiver 221. Specifically, second frame controller 222 determines, for each of the plurality of E frames received by E transmitter/receiver 221, whether the E frame satisfies the second condition defined in the second rule. When the E frame is determined as satisfying the second condition, second frame controller 222 determines the E frame as being anomalous. In contrast, when the E frame is determined as not satisfying the second condition, second frame controller 222 determines the E frame as not being anomalous, that is, normal.

Furthermore, when an anomalous E frame is detected, second frame controller 222 presents or stores a detection result indicating the detected anomalous E frame. In the case of storing the detection result, second frame controller 222 stores the detection result into third holder 230, for example. For example, second frame controller 222 may generate, for each pair of the source and the destination stored in each of the plurality of E frames obtained, log information about transmission and reception of the frame, and store the generated log information into third holder 230. Details of the log information will be described later with reference to FIG. 10.

Second controller 220 is specifically implemented using a microprocessor unit (MPU), and the functions of second frame controller 222 are implemented through software processes performed by the MPU. In other words, second frame controller 222 is implemented by software. Second holder 223 is implemented using non-volatile memory.

An internal interface, namely, media independent interface (MII) 250 allows connection and communication between E transmitter/receiver 211 of first controller 210 and E transmitter/receiver 221 of second controller 220.

First controller 210 can perform the high-speed security process using hardware, but there is a limit on security rules that can be set. In E switch 100A, in order to set a flexible security rule, second controller 220 different from first controller 210 is loaded with software for performing the anomaly detection process.

However, even if all the E frames received by first controller 210 are transferred to second controller 220 for more detailed analysis, when the performance of the MPU that provides the functions of second frame controller 222 is not good enough, it is difficult to examine all the E frames. Therefore, using the resources of other E switches, distributed processing of the E frame anomaly detection is performed.

For example, E switch 100A performs the anomaly detection process on 50% of the received E frames and transfers the remaining 50% of the E frames to another E switch, e.g., E switch 100B. Thus, E switch 100A may cause another E switch, namely, E switch 100B, to perform the anomaly detection process on the remaining 50% of the E frames. In this case, the first rule held in first holder 213 defines a rule indicating that among the plurality of E frames received by E transmitter/receiver 211, E frames accounting for the first proportion (e.g., 50%) are to be transferred or mirrored to second frame controller 222, and E frames accounting for the second proportion (e.g., 50%) are to be transferred or mirrored to another E switch that is E switch 100B in vehicle 1. A specific example of the first rule will be described later with reference to FIG. 6.

In accordance with the first rule, first frame controller 212 transfers or mirrors the frames accounting for the first proportion to second frame controller 222 and transfers or mirrors the frames accounting for the second proportion to another E switch that is E switch 100B. Next, in accordance with the second rule, second frame controller 222 performs the anomaly detection process on each of the frames transferred or mirrored thereto by first frame controller 212 that account for the first proportion.

Note that in the case of transferring or mirroring the frames accounting for the second proportion to another E switch that is E switch 100B, first frame controller 212 may transmit, to another E switch, i.e., E switch 100B, request information indicating a request for the other E switch, i.e., E switch 100B, to perform the anomaly detection process on each of the frames accounting for the second proportion, by adding the request information to the frames accounting for the second proportion. With this, when receiving the request information, another E switch, i.e., E switch 100B, performs the anomaly detection process on each of the frames accounting for the second proportion.

Note that an E switch serving as another anomaly detection device is, for example, E switch 100B, but the E switch is not limited to this example; the E switch may be E switch 100B or may be E switch 100C. Alternatively, another anomaly detection device may be E-CAN switch 200. In the above-described example, two devices, namely, E switch 100A and E switch 100B, are used to perform the distributed processing, but this is not limiting; the distributed processing may be performed using three or more devices. In this case, the plurality of E frames are divided into the number of devices, and each of the devices performs the anomaly detection process on the E frames allocated thereto. Furthermore, although the frames are divided equally among the devices in the above-described example, the frames may be divided into different proportions depending on the processing capability of each device. Specifically, the first rule may be defined so that a larger proportion is allocated to a device with higher processing capability among the plurality of devices.

Note that detailed description of the configuration of E switch 100B and the configuration of E switch 100C is omitted because these configurations are substantially the same as the configuration of E switch 100A.

Third holder 230 stores, for example, flow information and the anomaly detection results in first frame controller 212 and second frame controller 222. Third holder 230 may record the flow information in a format defined in IP flow information export (IPFIX), NetFlow, or the like.

Furthermore, E switch 100A includes diagnosis port 240. Diagnosis port 240 uses the Ethernet and is used in fault diagnosis application.

In the present embodiment, each of E switches 100A to 100C is, for example, a layer 2 switch (L2 switch).

Figure 4:
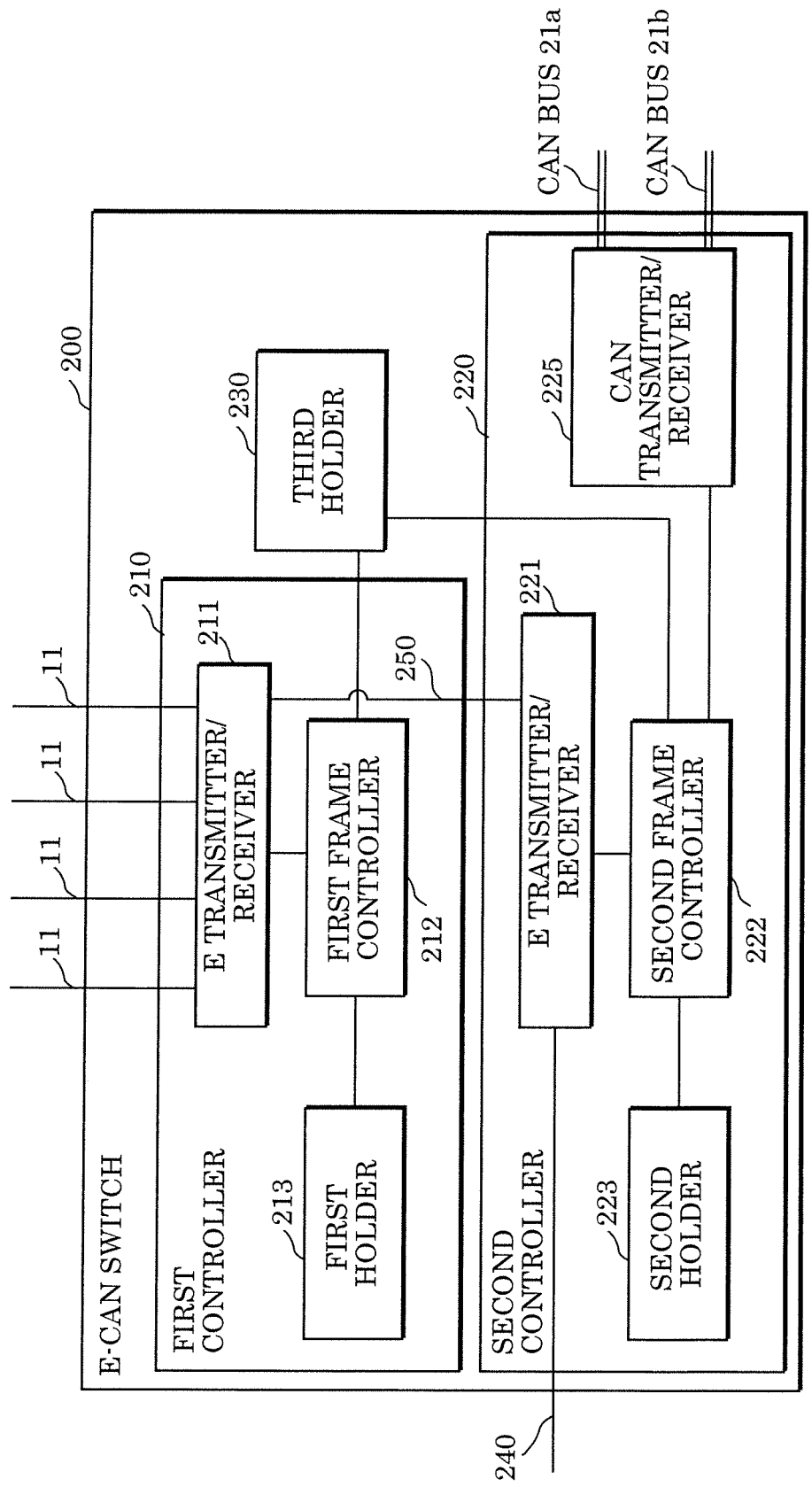
FIG. 4 is a block diagram illustrating one example of the functional configuration of an E-CAN switch.

FIG. 4 is a block diagram illustrating one example of the functional configuration of E-CAN switch 200.

In FIG. 4, structural elements that are the same as the structural elements included in E switch 100A in FIG. 3 are assigned the same reference numerals as the structural elements included in E switch 100A, and description thereof is omitted. E-CAN switch 200 is different from E switch 100A in that CAN transmitter/receiver 225 is further included. CAN transmitter/receiver 225 transmits and receives a CAN frame.

When E transmitter/receiver 211 receives an E frame including a CAN frame packed in a payload region, second frame controller 222 of E-CAN switch 200 obtains the CAN frame by unpacking the CAN frame in the received E frame. Details of processing for unpacking the CAN frame from the E frame will be described later with reference to FIG. 5. Second frame controller 222 performs a detection process to determine whether the obtained CAN frame is anomalous. Conversely, E-CAN switch 200 further performs processing for generating an E frame including a plurality of CAN frames packed therein by storing the plurality of CAN frames into the data region of the E payload of the E frame.

When second frame controller 222 determines that the CAN frame is not anomalous, CAN transmitter/receiver 225 transmits the CAN frame determined as not being anomalous to CAN bus 21*a* or CAN bus 21*b* in accordance with a CAN transfer rule (not illustrated in the drawings). The CAN transfer rule may be held by second frame controller 222, may be held by CAN transmitter/receiver 225, or may be set at the second rule held by second holder 223.

E-CAN switch 200 receives a CAN frame from CAN bus 21*a* or CAN bus 21*b* an stores the received one or more CAN frames into the payload of the E frame. E-CAN switch 200 transmits the E frame including one or more CAN frames stored in the payload to a destination device designated by E transmitter/receiver 211.

Furthermore, E-CAN switch 200 receives an E frame including a CAN frame stored therein and extracts the CAN frame from the received E frame. CAN transmitter/receiver 225 of E-CAN switch 200 transmits the extracted CAN frame to CAN bus 21*a* or CAN bus 21*b* in accordance with the CAN transfer rule (not illustrated in the drawings). At this time, CAN transmitter/receiver 225 may perform the anomaly detection process on the CAN frame in accordance with the second rule held by second holder 223.

Figure 5:
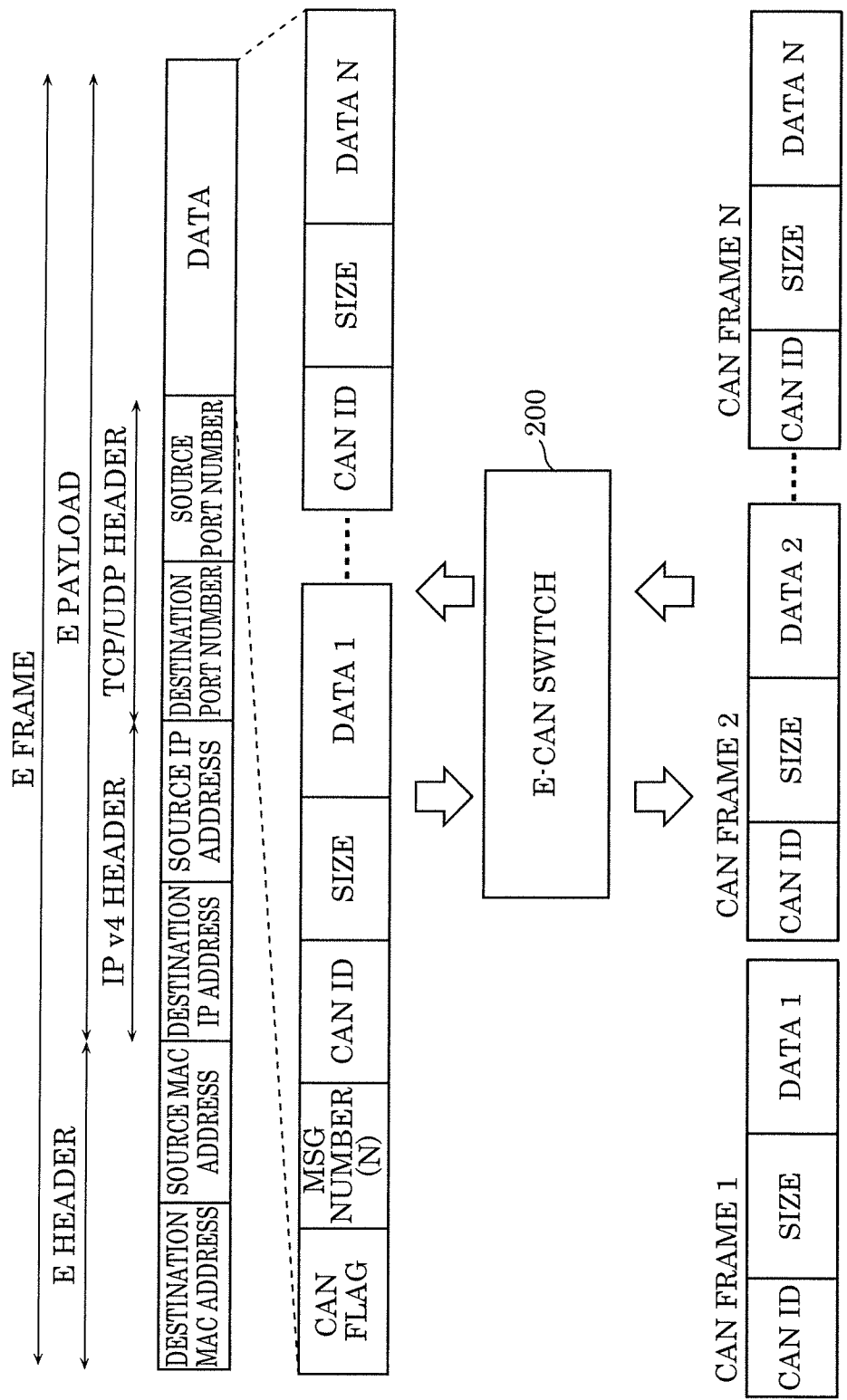
FIG. 5 is a diagram illustrating the relationship between an E frame and a plurality of CAN frames according to an embodiment.

FIG. 5 is a diagram for describing the processing for extracting a plurality of CAN frames from an E frame received by E-CAN switch 200 according to the embodiment and the processing for storing the plurality of CAN frames into the E payload of the E frame.

As illustrated in FIG. 5, the E frame includes: an Ethernet (registered trademark) payload into which data that is main content to be transmitted is stored (also referred to as an "E payload"); and an Ethernet (registered trademark) header (also referred to as an "E header"). The E header includes a destination MAC address and a source MAC address. The E payload includes an IP header, a TCP/UDP header, and data. The IP header includes a source IP address and a destination address. Note that in FIG. 5, the IP header is denoted as "IP v4 HEADER". The TCP/UDP header indicates a TCP header or a UDP header, and a source port number and a destination port number are included in the TCP/UDP header.

Specifically, E-CAN switch 200 in network system 7 receives an E frame including CAN frame information in the payload from first network 10. The CAN frame information include at least content (data) of a data field. The CAN frame information may include CAN-ID and the size, for example.

As illustrated in FIG. 5, the data in the payload of the E frame includes CAN frame information. The CAN frame information includes CAN-ID, the size, and the data. Here, the number of messages (MSG number) indicates the number of pieces of the CAN frame information. Note that instead of the number of messages, information indicating, for example, the total amount of data in the CAN frame information may be used. The CAN flag is an identification flag used to distinguish whether the E frame includes information transmitted from second network 20 (i.e., the CAN frame information); the CAN flag is ON when the CAN frame information is included in the E payload of the E frame, and is otherwise OFF (specifically, a value indicating information that contradicts that indicated when ON). In the example illustrated in FIG. 5, the CAN flag is positioned at the leading end of the E payload of the E frame, but this is merely one example. Including more than one piece of CAN frame information into the E payload of the E frame as in the example of FIG. 5 can lead, for example, to an increase in the transmission efficiency.

The processing for extracting the plurality of CAN frames from the E frame received by E-CAN switch 200 has been described thus far; for the processing for storing the plurality of CAN frames into the E payload of the E frame, it is sufficient that the processing for extracting the CAN frames be reversed.

FIG. 6 is a diagram illustrating one example of first rule 400 held by first holder 213.

As illustrated in FIG. 6, first rule 400 includes security rule 401 and distributed detection rule 402. Security rule 401 may be, for example, a TCAM security rule.

First rule 400 shows an example of the rule held by E switch 100A.

E switch 100A transmits, to autonomous driving ECU 110, the plurality of E frames obtained from camera 120, LIDAR 130, and dynamic map ECU 140. Autonomous driving ECU 110 issues a control command for autonomous driving on the basis of the plurality of E frames obtained from E switch 100A. Security rule 401 used at this time defines a first rule for determining whether each of the plurality of E frames obtained from camera 120, LIDAR 130, and dynamic map ECU 140 is anomalous. In the present embodiment, as illustrated in FIG. 2, there is connection and communication between E switch 100A an each of camera 120, LIDAR 130, dynamic map ECU 140, and autonomous driving ECU 110, and thus the IP address and/or the MAC address of each of camera 120, LIDAR 130, dynamic map ECU 140, and autonomous driving ECU 110 that are defined as being included in a whitelist are registered with security rule 401 as a source or a destination. Furthermore, the source port number or the destination port number for use in communication between a source device and a destination device may also be registered with security rule 401 in association with the IP address and/or the MAC address of each of the devices. This enables Ethernet communication only between devices permitted in advance and between port numbers corresponding to these devices. Furthermore, the flow rate of E frames between paired source and destination devices at the time of normal operations may also be registered with security rule 401. This enables E switch 100A to detect a DoS attack by detecting a flow rate deviating from the flow rate of E frames in communication between the devices at the time of normal operations that has been registered with security rule 401.

Distributed detection rule 402 defines which E switch performs the distributed detection process on what proportion of the E frames subject to the detection process. This proportion is one example of the first proportion and the second proportion. As distributed detection rule 402, FIG. 6 shows, as an example, a distributed detection rule indicating that second frame controller 222 of E switch 100A is to perform the anomaly detection process on ⅓ of the total number of E frames transmitted from camera 120 as a source to autonomous driving ECU 110 as a destination, another ⅓ of the total number of the E frames are to be transferred to E switch 100B, E switch 100B is to perform the anomaly detection process on these E frames, the remaining ⅓ of the total number of the E frames are to be transferred to E switch 100C, and E switch 100C is to perform the anomaly detection process on these E frames.

As another example, FIG. 6 shows a distributed detection rule indicating that second frame controller 222 of E switch 100A is to perform the anomaly detection process on ⅓ of the total number of E frames transmitted from LIDAR 130 as a source to autonomous driving ECU 110 as a destination, another ⅓ of the total number of the E frames are to be transferred to E switch 100B, E switch 100B is to perform the anomaly detection process on these E frames, the remaining ⅓ of the total number of the E frames are to be transferred to E switch 100C, and E switch 100C is to perform the anomaly detection process on these E frames.

As yet another example, FIG. 6 shows a distributed detection rule indicating that second frame controller 222 of E switch 100A is to perform the anomaly detection process on ½ of the total number of E frames transmitted from dynamic map ECU 140 as a source to autonomous driving ECU 110 as a destination, the remaining ½ of the total number of the E frames are transferred to E-CAN switch 200, and E-CAN switch 200 performs the anomaly detection process on these E frames.

Furthermore, in the distributed detection rule, information indicating whether to transfer or mirror the E frame subject to the detection process may be added.

FIG. 7 is a diagram illustrating one example of second rule 500 held by second holder 223.

Second rule 500 is created using a format in which a more specific and flexible rule than first rule 400 can be defined and includes security rule 501 and payload rule 502. Security rule 501 may be the same as or similar to security rule 401 in the whitelist illustrated in FIG. 6. Payload rule 502 is used to check the content of the E frame under more specific conditions. In payload rule 502, in the example of FIG. 7, "DATA FORMAT CHECK" for checking whether data stored in the E frame is in a proper format, "DATA VARIATION CHECK" for checking a variation of sequentially changing data such as sensor data, "DATA RANGE CHECK" in which the width of the range of stored data that includes the minimum value and the maximum value is set are stored as the second condition. Note that payload rule 502 is not limited to "DATA FORMAT CHECK", "DATA VARIATION CHECK", and "DATA RANGE CHECK" as long as payload rule 502 is used to determine whether there is anomaly in the E frame.

FIG. 8 is a diagram outlining the processing for distributing the E frames received by E switch 100A and detecting anomaly.

When E switch 100A receives frames F1 to F9 in sequence over time as illustrated in FIG. 8, E switch 100A performs the anomaly detection process on ⅓ of the number of frames (in FIG. 8, nine frames) that have been received (in FIG. 8, three frames) in accordance with distributed detection rule 402 described with reference to FIG. 6. Furthermore, E switch 100A transfers another ⅓ of the frames to E switch 100B to cause E switch 100B to perform the anomaly detection process on these frames, and transfers the remaining ⅓ of the frames to E switch 100C to cause E switch 100C to perform the anomaly detection process on these frames; in this manner, the distributed detection process is performed.

Thus, for example, E switch 100A performs the anomaly detection process on frames F1, F4, F7. Frames F2, F5, F8 are transferred or mirrored from E switch 100A to E switch 100B, and E switch 100B performs the anomaly detection process on these frames. Frames F3, F6, F9 are transferred or mirrored from E switch 100A to E switch 100C, and E switch 100C performs the anomaly detection process on these frames. In this manner, E frames from which anomaly cannot be detected in a software process performed by second controller 220 of E switch 100A can be subject to the anomaly detection process performed by second controllers 220 of other E switches, i.e., E switches 100B, 100C. Thus, the anomaly detection process using the second rule can be performed on all the E frames that have been determined by first controller 210 as being required to be subject to the anomaly detection process among the plurality of E frames received by E switch 100A.

Figure 9:
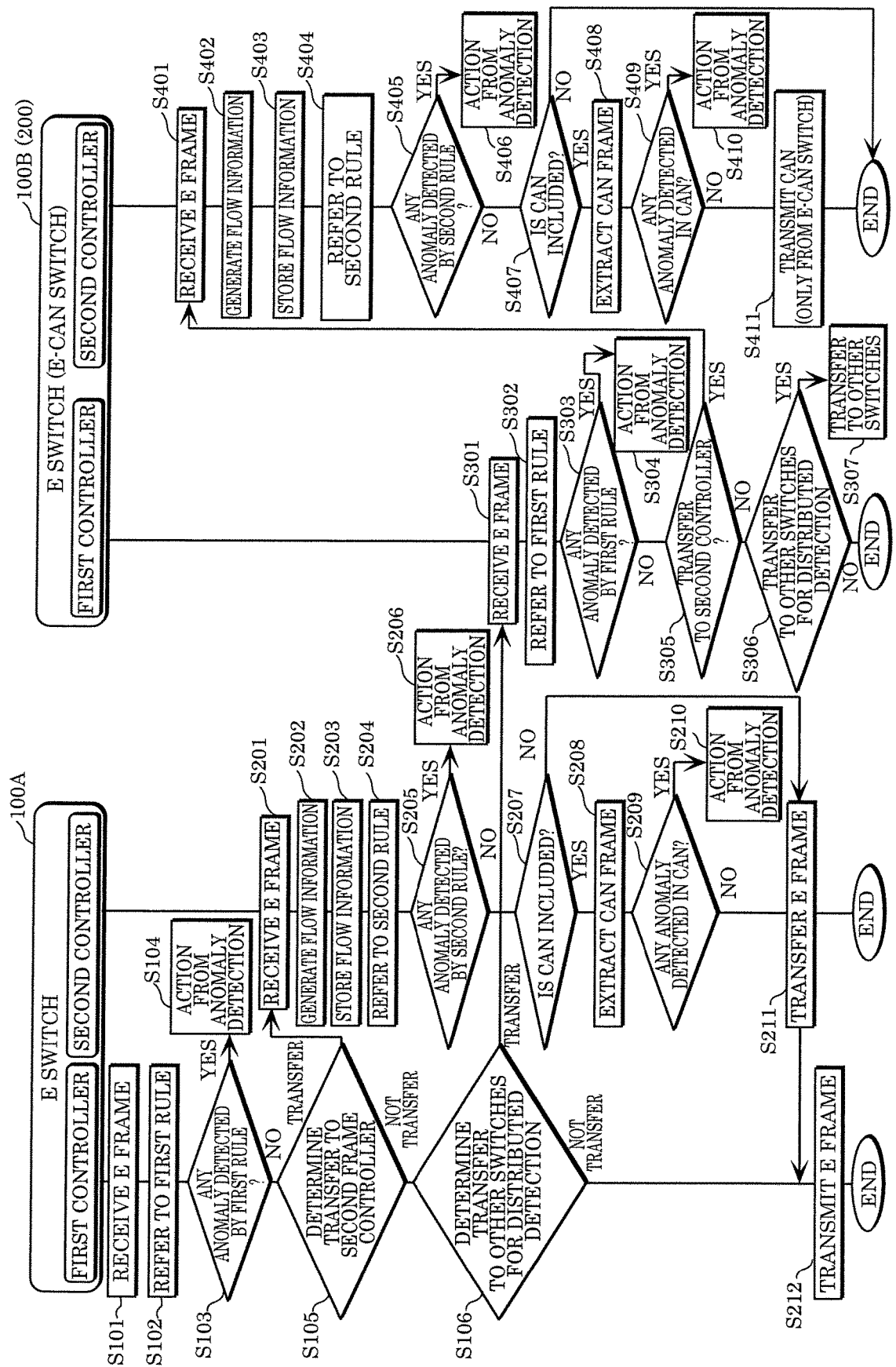
FIG. 9 is a sequence diagram of distributed anomaly detection on E frames.

FIG. 9 is a sequence diagram of distributed detection processing performed by E switch 100A in coordination with E switch 100B or E-CAN switch 200.

In E switch 100A, E transmitter/receiver 211 of first controller 210 receives a plurality of E frames (S101).

First frame controller 212 of E switch 100A refers to the first rule held by first holder 213 (S102).

In accordance with the first rule, first frame controller 212 of E switch 100A performs the anomaly detection process on each of the plurality of received E frames to determine whether the E frame is anomalous (S103). When first frame controller 212 determines that the E frame is an anomalous frame (YES in S103), first frame controller 212 causes the processing to proceed to S104.

First frame controller 212 of E switch 100A records, onto third holder 230, the anomaly detection result, that is, information about the E frame determined as being an anomalous frame (S104). Here, first frame controller 212 may provide the anomaly detection result obtained in Step S103 to IVI 310 or monitoring server 80.

When first frame controller 212 of E switch 100A determines that the E frame is not an anomalous frame (NO in S103), first frame controller 212 determines, in accordance with the first rule, whether to transfer the E frame to second controller 220 (S105). When distributed detection rule 402 of first rule 400 includes information indicating the need of transfer to second controller 220 of E switch 100A, the E frame is transferred to second controller 220 of E switch 100A. Note that the transfer may be replaced by mirroring. The same applies to the transfer in the other steps.

First frame controller 212 of E switch 100A determines, in accordance with the first rule, whether to transfer the received E frame to other E switches so that the other E switches perform the anomaly detection process (S106). When distributed detection rule 402 of first rule 400 defines that a target E frame is subject to the detection process of other E switches, first frame controller 212 transfers the target E frame to the other E switches in accordance with the defined rule. For example, when first rule 400 defines that ⅓ of target E frames are to be transferred to another E switch, first frame controller 212 transfers ⅓ of the target E frames to the other E switch.

In E switch 100A, E transmitter/receiver 221 of second controller 220 receives the E frame transferred from first controller 210 in Step S105 (S201).

Second frame controller 222 of E switch 100A generates flow information from the received E frame (S202). The flow information herein includes the IP addresses, the MAC addresses, the port numbers, the protocol numbers, etc., of the source and the destination and is used to monitor the communication between the devices.

Second frame controller 222 of E switch 100A causes third holder 230 to store the flow information generated in Step S202 (S203).

Second frame controller 222 of E switch 100A refers to the second rule held by second holder 223 (S204).

In accordance with the second rule, second frame controller 222 of E switch 100A performs, for each of the plurality of E frames received from first controller 210, the anomaly detection process to determine whether the E frame is anomalous (S205). When second frame controller 222 determines that the E frame is an anomalous frame (YES in S205), second frame controller 222 causes the processing to proceed to S206.

Second frame controller 222 of E switch 100A records, onto third holder 230, the anomaly detection result, that is, information about the E frame determined as being an anomalous frame (S206). Here, second frame controller 222 may provide the anomaly detection result obtained in Step S205 to IVI 310 or monitoring server 80.

When second frame controller 222 of E switch 100A determines that the E frame is not an anomalous frame (NO in S205), second frame controller 222 determines whether a CAN frame is included in the E frame (S207).

When a CAN frame is included in the E frame (YES in S207), second frame controller 222 of E switch 100A extracts the CAN frame from the E frame (S208).

In accordance with the second rule, second frame controller 222 of E switch 100A performs the anomaly detection process on the extracted CAN frame (S209).

Second frame controller 222 of E switch 100A records, onto third holder 230, the anomaly detection result, that is, information about the CAN frame determined as being an anomalous frame (S210). Here, second frame controller 222 may provide the anomaly detection result obtained in Step S209 to IVI 310 or monitoring server 80.

When a CAN frame is not included in the E frame (NO in S207), second frame controller 222 of E switch 100A transfers the E frame to first controller 210 (S211). When the E frame is the frame mirrored by first controller 210, second controller 220 may provide only the detection result obtained by second frame controller 222 to first controller 210. In other words, first controller 210 may perform transfer control on the E frame on the basis of the provided detection result.

Next, the processing of other E switches will be described. In the following description, E switch 100B is mainly cited as an example, but there are cases where E-CAN switch 200 is cited as an example.

E switch 100B receives a plurality of E frames transferred from E switch 100A in Step S106 (S301).

First frame controller 212 of E switch 100B refers to the first rule held by first holder 213 (S302).

In accordance with the first rule, first frame controller 212 of E switch 100B performs the anomaly detection process on each of the plurality of received E frames to determine whether the E frame is anomalous (S303). When first frame controller 212 determines that the E frame is an anomalous frame (YES in S303), first frame controller 212 causes the processing to proceed to S304.

First frame controller 212 of E switch 100B records, onto third holder 230, the anomaly detection result, that is, information about the E frame determined as being an anomalous frame (S304). Here, first frame controller 212 may provide the anomaly detection result obtained in Step S303 to IVI 310 or monitoring server 80.

When first frame controller 212 of E switch 100B determines that the E frame is not an anomalous frame (NO in S303), first frame controller 212 determines, in accordance with the first rule, whether to transfer the E frame to second controller 220 (S305). When distributed detection rule 402 of first rule 400 includes information indicating the need of transfer to second controller 220 of E switch 100B, the E frame is transferred to second controller 220 of E switch 100B.

First frame controller 212 of E switch 100B determines, in accordance with the first rule, whether to transfer the received E frame to other E switches so that the other E switches perform the anomaly detection process (S306).

On the basis of the result of the determination in Step S306, first frame controller 212 performs substantially the same processing as that performed by E switch 100A in Step S106. When distributed detection rule 402 of first rule 400 defines that a target E frame is subject to the detection process of other E switches, first frame controller 212 of E switch 100B transfers the target E frame to E switch 100A in accordance with the defined rule (S307).

In E switch 100B, E transmitter/receiver 221 of second controller 220 receives the E frame transferred from first controller 210 in Step S305 (S401).

Second frame controller 222 of E switch 100B generates flow information from the received E frame (S402). The flow information herein includes the IP addresses, the MAC addresses, the port numbers, the protocol numbers, etc., of the source and the destination and is used to monitor the communication between the devices.

Second frame controller 222 of E switch 100B causes third holder 230 to store the flow information generated in Step S402 (S403).

Second frame controller 222 of E switch 100B refers to the second rule held by second holder 223 (S404).

In accordance with the second rule, second frame controller 222 of E switch 100B performs, for each of the plurality of E frames received from first controller 210, the anomaly detection process to determine whether the E frame is anomalous (S405). When second frame controller 222 determines that the E frame is an anomalous frame (YES in S405), second frame controller 222 causes the processing to proceed to S406.

Second frame controller 222 of E switch 100B records, onto third holder 230, the anomaly detection result, that is, information about the E frame determined as being an anomalous frame (S406). Here, second frame controller 222 may provide the anomaly detection result obtained in Step S405 to IVI 310 or monitoring server 80.

When second frame controller 222 of E switch 100B determines that the E frame is not an anomalous frame (NO in S405), second frame controller 222 determines whether a CAN frame is included in the E frame (S407).

When a CAN frame is included in the E frame (YES in S407), second frame controller 222 of E switch 100B extracts the CAN frame from the E frame (S408).

In accordance with the second rule, second frame controller 222 of E switch 100B performs the anomaly detection process on the extracted CAN frame (S409).

Second frame controller 222 of E switch 100B records, onto third holder 230, the anomaly detection result, that is, information about the CAN frame determined as being an anomalous frame (S410). Here, second frame controller 222 may provide the anomaly detection result obtained in Step S409 to IVI 310 or monitoring server 80.

In the case where E switch 100B includes CAN transmitter/receiver 225 as does E-CAN switch 200, when the CAN frame is determined as not being anomalous (NO in S409), CAN transmitter/receiver 225 transmits the CAN frame (S411).

FIG. 10 is a diagram illustrating one example of flow information 700 held by third holder 230.

The flow information includes the time frame (start time and end time) in which the flow is observed, the source port number, the IP address of each of the source and the destination, the MAC address of each of the source and the destination, the output port number, and the rate of flow observed in observation time. Note that the time frame of the flow information in which the flow is observed may be managed as flow identification information. Although not illustrated in FIG. 10, the flow information may include protocol types such as a transmission control protocol (TCP) and a user datagram protocol (UDP). Note that in FIG. 10, the name of a devices is indicated in the IP address of each of the source and the destination and the MAC address of each of the source and the destination; thus, the IP address or the MAC address associated with a device is indicated.

Figure 11:
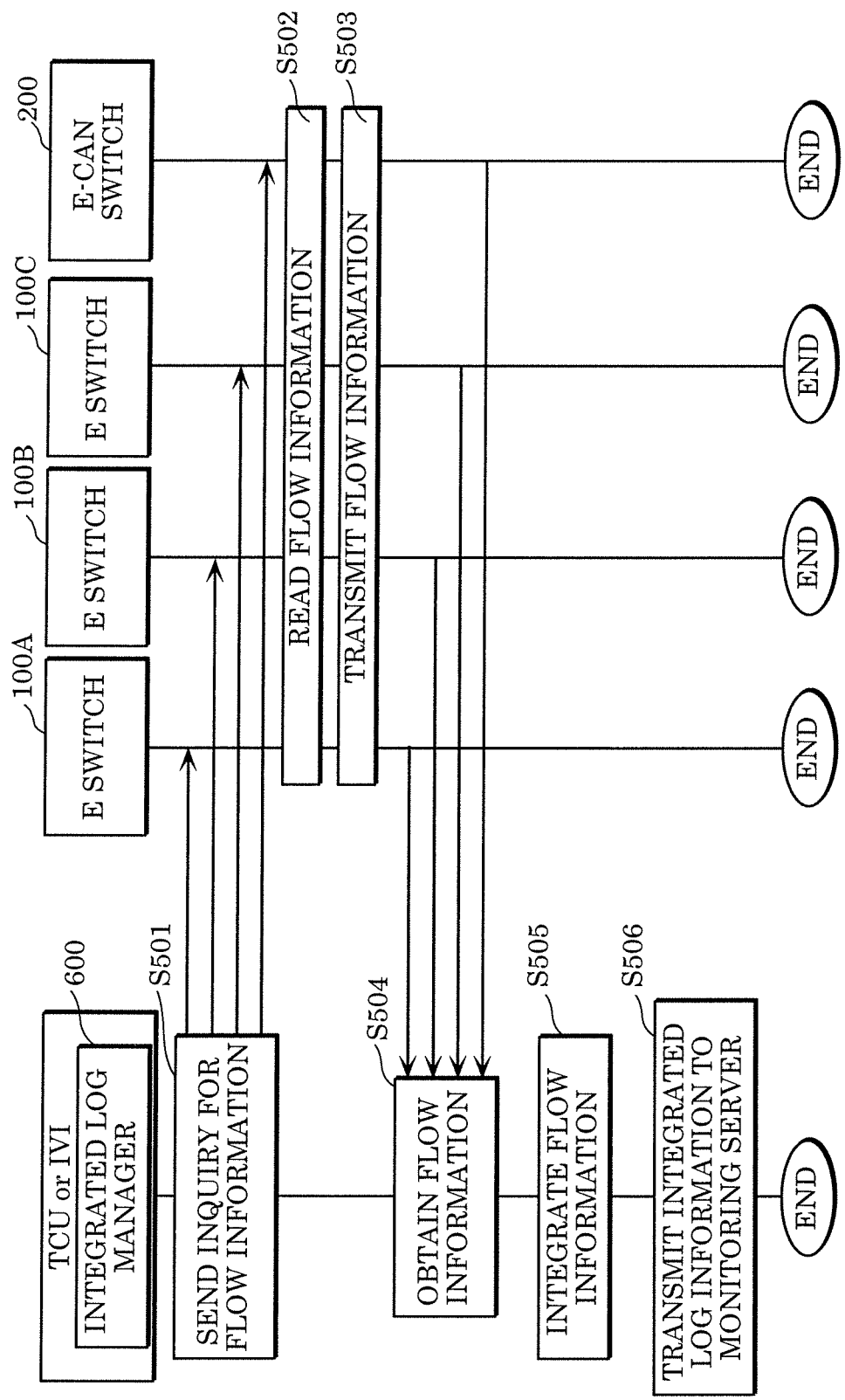
FIG. 11 is a diagram illustrating the processing for combining flow information distributed to and recorded on a plurality of E switches.

FIG. 11 illustrates the processing for combining flow information distributed to and recorded on a plurality of E switches. The plurality of E switches include E-CAN switch 200.

The present embodiment assumes that telematics communication unit 410 or IVI 310 includes integrated log manager 600 which integrates the flow information distributed to and recorded on corresponding E switches 100A to 100C and E-CAN switch 200. Specifically, network system 7 includes E switches 100A to 100C and E-CAN switch 200, which are a plurality of anomaly detection devices, and integrated log manager 600. Integrated log manager 600 obtains one or more pieces of the log information from each of E switches 100A to 100C and E-CAN switch 200 on vehicle 1. Furthermore, integrated log manager 600 generates integrated log information by integrating the one or more pieces of the log information obtained from E switch 100A, the one or more pieces of the log information obtained from E switch 100B, the one or more pieces of the log information obtained from E switch 100C, and the one or more pieces of the log information obtained from E-CAN switch 200. Integrated log manager 600 stores the generated integrated log information.

Thus, in the case where the anomaly detection process is divided to be performed by more than one of E switches 100A to 100C and E-CAN switch 200, the anomaly detection results from these switching devices are integrated. Therefore, it is possible to monitor the tendency of one or more frames flowing through network system 7 in vehicle 1 such as the type, the source, the destination, and the flow rate of the flowing frames.

Integrated log manager 600 of telematics communication unit 410 or IVI 310 sends inquiries about the flow information serving as the log information to E switch 100A, E switch 100B, E switch 100C, and E-CAN switch 200 (S501). Specifically, integrated log manager 600 transmits a request for the flow information to E switch 100A, E switch 100B, E switch 100C, and E-CAN switch 200.

Each of E switch 100A, E switch 100B, E switch 100C, and E-CAN switch 200 which has received the inquiry from integrated log manager 600 reads the flow information stored in third holder 230 of the switch itself (S502).

Each of E switch 100A, E switch 100B, E switch 100C, and E-CAN switch 200 transmits, to integrated log manager 600, flow information read in Step S502 (S503).

Integrated log manager 600 receives the flow information from each of E switch 100A, E switch 100B, E switch 100C, and E-CAN switch 200 (S504).

Integrated log manager 600 generates integrated log information by integrating two or more pieces of flow information received from E switch 100A, E switch 100B, E switch 100C, and E-CAN switch 200 (S505). Upon the integration, integrated log manager 600 determines, for unit information of each unit of these pieces of flow information, whether items included in the flow information are the same. For example, upon the integration, regarding the unit information of each unit of these piece of flow information, integrated log manager 600 regards, as one piece of the unit information, two or more pieces of unit information that have the same combination of the source IP and the destination IP and correspond to the same time frame. Note that in the case of integrating two or more piece of unit information as one unit information, integrated log manager 600 integrates these piece by adding the values of flow rate in these pieces of unit information that have been sampled as distributed detection logs. Furthermore, when an equivalent value of the flow rate estimated from the sampling result (for example, an equivalent value of the flow rate estimated by tripling the flow rate result obtained by sampling of ⅓ of the frames) is used as the rate of flow of the distributed detection log in each anomaly detection device instead of the flow rate obtained by actual sampling, integrated log manager 600 may calculate, as the integrated flow rate, the average value of flow rates of the flow information in the distributed detection (for example, the average value of three flow rates obtained from three anomaly detection devices in each of which ⅓ of the frames are sampled).

Integrated log manager 600 transmits the resultant integrated log information to monitoring server 80 (S506). Integrated log manager 600 may regularly transmit the integrated log information to monitoring server 80 or may transmit the integrated log information to monitoring server 80 at a point in time when a predetermined volume of the integrated log information is accumulated or may irregularly transmit the integrated log information to monitoring server 8 at the occurrence of some event.

FIG. 12 is a diagram illustrating one example of integrated log information 710 generated by integrated log manager 600.

In an example in the present embodiment, three switches, namely, E switch 100A, E switch 100B, and E switch 100C, perform, in coordination with one another, distributed detection processing on the flow in which the source is camera 120. Here, in the flow information in each of the anomaly detection devices before the integration that is illustrated in FIG. 10, the unit information in the time frame 8:00-8:10 indicates an observed flow rate of 3 Mbps. Therefore, in the flow of camera 120 in integrated log information 710, the observed flow rate is 9 Mbps as a result of integrating the flow information which is the result of the distributed detection processing. This shows that although not illustrated in the drawings, in the other anomaly detection devices than the anomaly detection device illustrated in FIG. 10, the total of unit information in the time frame 8:00-8:10 is 6 Mbps. Furthermore, in the flow of the camera in integrated log information 710, the flow rate changes to 6 Mbps in the next time frame, and then to 11 Mbps in the following time frame. Logs in other flows can be interpreted in the same manner as described above; thus, detailed description is omitted.

Note that in FIG. 12, as in FIG. 10, the name of a device is indicated on the IP address of each of the source and the destination and the MAC address of each of the source and the destination; thus, the IP address or the MAC address associated with a device is indicated.

Figure 13:
FIG. 13 is a diagram illustrating one example of an anomaly detection log.

FIG. 13 is a diagram illustrating one example of anomaly detection log 800 in the case where anomaly is detected from the E frame or the CAN frame in accordance with the first rule or the second rule of the Ethernet. Anomaly detection log 800 includes: (i) a time frame in which an attack occurs; (ii) an alert level indicating a security emergency level; (iii) an attack type such as Dos attack destination anomaly and payload anomaly; (iv) the IP address, the MAC address, and the port number of each of the source and the destination; and (v) the flow rate of a flow observed. Anomaly detection log 800 detected in each of E switch 100A, E switch 100B, E switch 100C, and E-CAN switch 200 may be transmitted from the corresponding one of E switch 100A, E switch 100B, E switch 100C, and E-CAN switch 200 to integrated log manager 600, as with the flow information, or may be directly provided from the corresponding one of E switch 100A, E switch 100B, E switch 100C, and E-CAN switch 200 to monitoring server 80.

Figure 14:
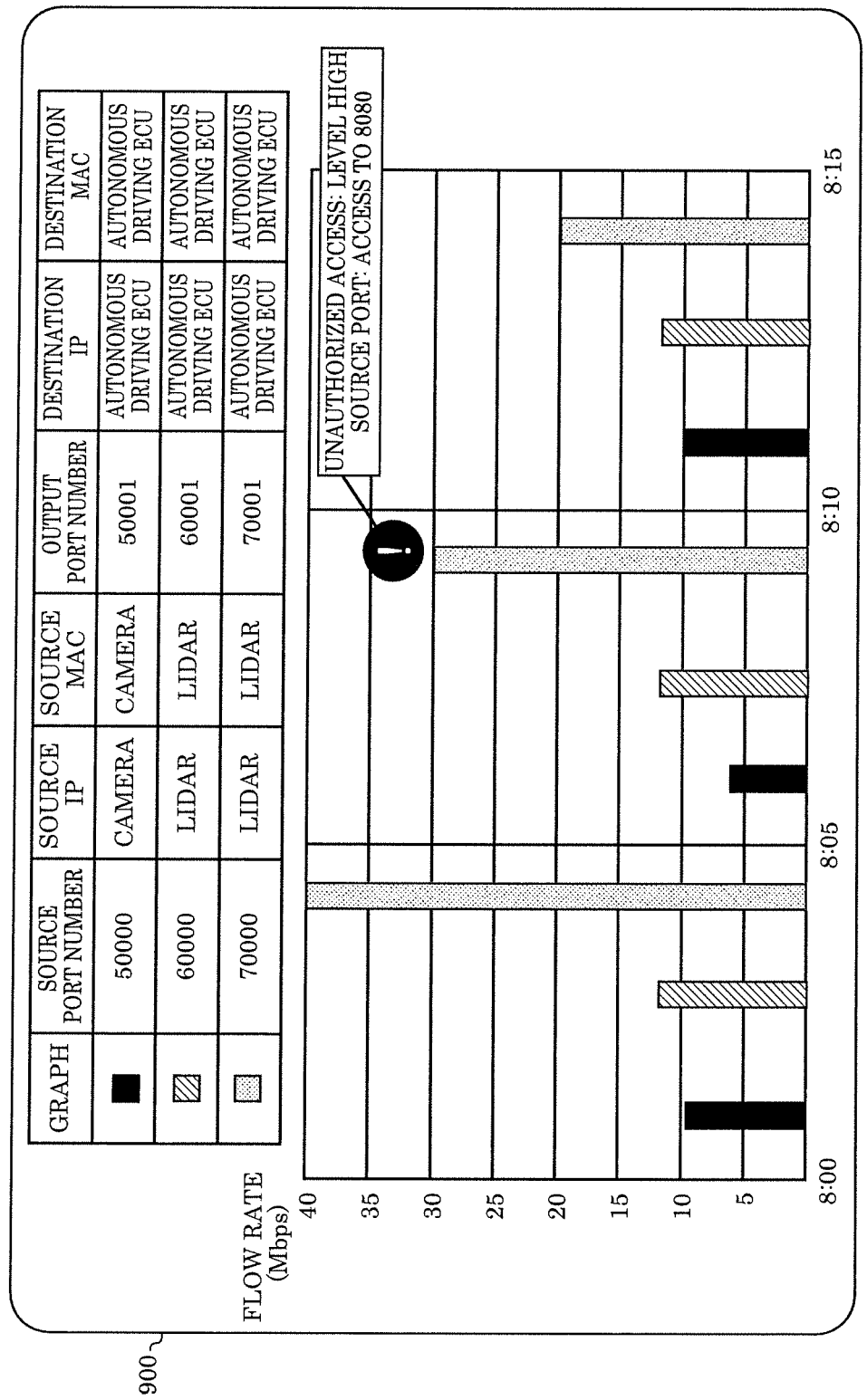
FIG. 14 is a diagram illustrating one example of a screen displayed by a monitoring server.

FIG. 14 illustrates one example of screen 900 displayed by monitoring server 80 in the case where flow information 700 illustrated in FIG. 12 and anomaly detection log 800 illustrated in FIG. 13 are received from integrated log manager 600. With screen 900 displayed on monitoring server 80, a user of vehicle 1 can easily know how much communication occurs from where to where. Screen 900 may further include the association between the anomaly detection result and the flow information. Thus, when screen 900 is displayed, the anomaly detection result and the flow information can be linked and displayed, and accordingly a user of vehicle 1 can know what anomaly has been detected in which time frame.

With E switch 100A serving as an anomaly detection device according to the present embodiment, it is possible to perform the anomaly detection process on one or more frames flowing through network system 7, in two stages in accordance with first rule 400 and second rule 500. E switch 100A transfers or mirrors an E frame satisfying the first condition based on the source and the destination in accordance with first rule 400 and determines, in accordance with the second rule, that the E frame selected in accordance with the first rule is anomalous. Therefore, the number of E frames subject to the anomaly detection process can be set small in such a manner that the accuracy of detecting anomaly is not reduced, and thus it is possible to reduce the processing load in anomaly detection in which the second rule is used. Consequently, it is possible to effectively detect anomaly.

In E switch 100A according to the present embodiment, first frame controller 212 is implemented by hardware, and second frame controller 222 is implemented by software. With this, a processing function using first rule 400 is implemented through hardware, and thus processing using the first rule can be performed at high speed. Furthermore, a processing function using the second rule is implemented through software, and thus the definition of the second rule can be flexibly changed using the software. This makes it possible to easily set a flexible security rule like packet inspection, for example.

Furthermore, with E witch 100A according to the present embodiment, the anomaly detection is also distributed to and processed by other E switches, namely, E switches 100B, 100C, and E-CAN switch 200, and thus it is possible to reduce the processing load in anomaly detection on each anomaly detection device, allowing more frames to be subject to the anomaly detection process.

Furthermore, with E switch 100A according to the present embodiment, since the log information is generated, it is possible to monitor the tendency of flowing frames such as the type, the source, the destination, and the flow rate of one or more frames flowing through the in-vehicle network.

Other Embodiments

As described above, Embodiment 1 is presented as an example of the technique according to the present disclosure. However, the technique according to the present disclosure is not limited to the foregoing embodiment, and can also be applied to embodiments to which a change, substitution, addition, or omission is executed as necessary. For example, the following variations are included as embodiments of the present disclosure.

(1) In the above embodiment, data frames are transmitted over the in-vehicle network in accordance with the CAN protocol, but the CAN protocol may be regarded as referring to a broad meaning that includes derivative protocols such as CANOpen used in, for example, an embedded system in an automation system, Time-Triggered CAN (TTCAN), and CAN with Flexible Data Rate (CANFD). Alternatively, the in-vehicle network may use a protocol other than the CAN protocol. For example, Local Interconnect Network (LIN), Media Oriented Systems Transport (MOST) (registered trademark), FlexRay (registered trademark), Ethernet (registered trademark), or the like may be used as a protocol for an in-vehicle network in which frames for controlling a vehicle are transmitted. Networks using these protocols may be used as sub-networks; sub-networks based on two or more kinds of protocol may be combined to form an in-vehicle network. the Ethernet (registered trademark) protocol may be regarded as referring to a broad meaning that includes derivative protocols such as Ethernet (registered trademark) Audio Video Bridging (AVB) based on the IEEE 802.1, Ethernet (registered trademark) Time Sensitive Networking (TSN) based on the IEEE 802.1, Ethernet (registered trademark)/Industrial Protocol (IP), EtherCAT (registered trademark) (Ethernet (registered trademark) for Control Automation Technology), and the like. Note that a network bus for the in-vehicle network may be, for example, a wired communication path made up of a wire, an optical fiber, or the like.

(2) In the above embodiment, the data frame in the CAN protocol that is handled by CAN transmitter/receiver 225 is described in a standard ID format, but the data frame may be described in an extended ID format, and the ID of the data frame may be an extended ID or the like in the extended ID format. Furthermore, the above-described data frame may be one type of frame in a network that uses a protocol other than the CAN; in this case, an ID for identifying the type, etc., of that frame corresponds to the ID of the data frame.

(3) The above embodiment prevents anomaly in the autonomous driving control command; anomaly in the control of a parking assist system or advanced driver-assistance systems such as a lane centering function and a collision avoidance function may also be detected.

(4) In the above embodiment, when anomaly is detected, an anomaly report is provided to monitoring server 80, in-vehicle infotainment 310, etc., but, if communication using V2X, V2I or the like, is possible, and if the vehicle supports inter-vehicle communication, vehicle-to-roadside communication, or the like, the anomaly report may be provided to another vehicle or the anomaly report may be provided to an infrastructure system. With this, a vehicle, a device owned by a pedestrian, and so on near the host vehicle can be notified of an anomaly, which can lead to accident prevention.

(5) In the above embodiment, when anomaly is detected, an anomaly report is provided to monitoring server 80, in-vehicle infotainment 310, etc., but the anomaly report may be recorded on a device in the in-vehicle network as a log. In the case where the anomaly report is recorded as a log, a dealer can grasp details of the anomaly by reading the log from the diagnosis port. Furthermore, the log may be regularly transmitted to monitoring server 80. This enables remote anomaly detection for vehicles.

(6) In the above embodiment, E switch 100A transfers or mirrors an E frame without changes when requesting E switch 100B, 100C or E-CAN switch 200 to perform the anomaly detection process on the E frame, but there is no need to transmit the entire data of the E frame. For example, E switch 100A may extract a specified region from the E frame and transmit or mirror the specified region. For example, E switch 100A may limit the specified region to the header region of the E frame. In this case, E switch 100A may insert the extracted E header region into the payload of the E frame and request E switch 100B, 100C or E-CAN switch 200 to perform the anomaly detection process. This makes it possible to obtain information to be saved as the flow information while the network load is reduced.

(7) In the above description, devices to which the detection process is distributed are limited to E switch 100A, E switch 100B, E switch 100C, and E-CAN switch 200, but such devices are not limited to these switching devices; the request for the distributed detection process may be sent to HUD 320, IVI 310, or other ECUs.

(8) In the above embodiment, first rule 400 in FIG. 6 and second rule 500 in FIG. 7 define normal conditions as a whitelist, but may define anomalous conditions as a blacklist or may define conditions that are a combination of a whitelist and a blacklist. Furthermore, as rules defined in first rule 400 and second rule 500, conditions of the frequency of communication and the value of payload may be defined in addition to the flow rate.

(9) The above embodiment describes an example in which integrated log manager 600 is disposed in telematics communication unit 410 or IVI 310 which is a device different from E switch 100A, but the position of integrated log manager 600 is not limited to this example. The integrated log manager may be disposed in E switch 100A, for example. The integrated log manager disposed in E switch 100A obtains one or more pieces of log information from each of one or more switches, namely, E switches 100B, 100C and E-CAN switch 200, in vehicle 1. The integrated log manager generates integrated log information by integrating the one or more pieces of log information obtained and the log information stored in third holder 230 of E switch 100A. Furthermore, the integrated log manager stores the generated integrated log information into third holder 230 of E switch 100A.

Thus, in the case where the anomaly detection process is divided to be performed by more than one of E switches 100A to 100C and E-CAN switch 200, the anomaly detection results from these switching devices are integrated. Therefore, it is possible to monitor the tendency of one or more frames flowing through network system 7 in vehicle 1 such as the type, the source, the destination, and the flow rate of the flowing frames.

(10) In the above embodiment, each of E switch 100A, E switch 100B, E switch 100C, and E-CAN switch 200 is a layer 2 switch (L2 switch), but may be a layer 3 switch (L3 switch), may be a layer 4 switch (L4 switch), or may be a router.

(11) The domain of network system 7 may be divided into two or more domains using the VLAN. For example, assume that E switch 100A serving as an anomaly detection device and E switch 100B serving as another anomaly detection device belong to different ones of the two or more domains. In the case where second controller 220 requests a switching device in a domain with a different VLAN ID to perform the anomaly detection on a frame, the VLAN ID may be rewritten upon the transfer or mirroring. Specifically, in the case where first frame controller 212 of E switch 100A transfers or mirrors an E frame to E switch 100B, identification information for identifying a domain to which E switch 100B belongs is added to the E frame to be transferred or mirrored or the identification information included in the frame is rewritten into identification information for identifying the domain to which E switch 100B belongs upon the transfer or mirroring of the E frame.

With this, also in an in-vehicle network divided into domains using a tag VLAN, the frame anomaly detection can be distributed to and processed by a plurality of anomaly detection devices belonging to different domains.

(12) The above embodiment describes an example in which the anomaly detection device is installed in a vehicle and included in the in-vehicle network system which performs communication for controlling the vehicle, but the anomaly detection device may be included in a network system for controlling an object other than a vehicle. Examples of the object to be controlled other than a vehicle include heavy equipment, a robot, an aircraft, a boat, a machine, a construction machine, farm equipment, and a drone.

(13) Each device such as the ECU described in the above embodiment may include a hard disk unit, a display unit, a keyboard, a mouse, and so on in addition to memory, a processor, and the like. Alternatively, each device such as the ECU described in the above embodiment may provide its functions in the form of software by a program stored in the memory being executed by the processor, or may provide its functions by dedicated hardware (e.g., a digital circuit) without using a program. Note that allocation of the functions between the structural elements in each device can be changed.

(14) Some or all of the structural elements included in each device in the above embodiment may be one system LSI (Large Scale Integration: large scale integrated circuit). The system LSI is a super multifunctional LSI manufactured by integrating a plurality of components onto a signal chip. Specifically, the system LSI is a computer system configured of a microprocessor, a ROM, a RAM, and so on. A computer program is stored in the RAM. The system LSI achieves its function as a result of the microprocessor operating in accordance with the computer program. Furthermore, each unit of the structural elements included in each device described above may be individually configured into single chips, or some or all of the units may be configured into a single chip. Moreover, although a system LSI is mentioned here, the integrated circuit can also be called an IC, a LSI, a super LSI, and an ultra LSI, depending on the level of integration. Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used. In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

(15) Furthermore, a portion or all of the structural elements included in each device described above may be implemented as a standalone module or an IC card that can be inserted into and removed from the device. The IC card or the module is a computer system made up of a microprocessor, a ROM, a RAM, and so on. The IC card or the module may include the aforementioned super multifunctional LSI. The IC card or the module achieves its functions as a result of the microprocessor operating in accordance with the computer program. The IC card and the module may be tamperproof.

(16) One aspect of the present disclosure may be a program (computer program) implementing an anomaly detection method with a computer or may be a digital signal of the computer program. Furthermore, one aspect of the present disclosure may be the computer program or the digital signal recorded on a computer-readable recording medium, such as a flexible disk, a hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be implemented as the digital signal recorded on the aforementioned recoding media. Furthermore, one aspect of the present disclosure may be the computer program or the digital signal transmitted via an electrical communication line, a wireless or wired communication line, a network represented by the Internet, data broadcasting, or the like. Furthermore, one aspect of the present disclosure may be a computer system including a microprocessor and memory. The memory may store the computer program and the microprocessor may operate in accordance with the computer program. Moreover, by transferring the recording medium having the program or the digital signal recorded thereon or by transferring the program or the digital signal via the network or the like, the present disclosure may be implemented by a different independent computer system.

(17) Embodiments realized by arbitrarily combining the structural elements and functions described in the above embodiment and variations are included in the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful as an anomaly detection device capable of effectively detecting anomaly in an in-vehicle network system, the in-vehicle network system, an anomaly detection method, or the like.

What is claimed is:

1. An anomaly detection device for detecting anomaly in a frame flowing through an in-vehicle network system in a vehicle, the anomaly detection device comprising:
an obtainer that obtains one or more frames in each of which at least a destination is stored;
a first holder that holds a first rule defining a first anomaly detection rule and a mirroring rule, the first anomaly detection rule indicating that each of the one or more frames that satisfies a first condition is to be determined as being anomalous, the mirroring rule indicating that when a frame included in the one or more frames satisfies a second condition that the destination of the frame is an electronic control unit that performs a predetermined control, the frame is to be transferred or mirrored;
a first frame controller that performs an anomaly detection process on each of the one or more frames in accordance with the first anomaly detection rule, and controls transferring or mirroring of the one or more frames in accordance with the mirroring rule;
a second holder that holds a second rule defining a second anomaly detection rule indicating that a frame satisfying a third condition is to be determined as being anomalous, the third condition being more specific than the first condition; and
a second frame controller that performs, in accordance with the second rule, the anomaly detection process on each of the one or more frames transferred or mirrored by the first frame controller, wherein
when an anomalous frame is detected, the second frame controller provides or stores a detection result indicating the anomalous frame detected,
the obtainer obtains a plurality of frames including the one or more frames,
the first rule defines a rule indicating that among the plurality of frames obtained by the obtainer, frames accounting for a first proportion are to be transferred or mirrored to the second frame controller, and frames accounting for a second proportion are to be transferred or mirrored to another anomaly detection device in the vehicle,
the first frame controller transfers or mirrors the frames accounting for the first proportion to the second frame controller and transfers or mirrors the frames accounting for the second proportion to the other anomaly detection device in accordance with the first rule, and the second frame controller performs, in accordance with the second rule, the anomaly detection process on each of the frames transferred or mirrored by the first frame controller that account for the first proportion.

2. The anomaly detection device according to claim 1, wherein the first frame controller is implemented by hardware, and
the second frame controller is implemented by software.

3. The anomaly detection device according to claim 1, wherein when transferring or mirroring the frames accounting for the second proportion to the other anomaly detection device, the first frame controller transmits request information to the other anomaly detection device by adding the request information to the frames accounting for the second proportion, the request information indicating that the first frame controller requests the other anomaly detection device to perform the anomaly detection process on each of the frames accounting for the second proportion.

4. The anomaly detection device according to claim 3, wherein a domain of the in-vehicle network system is divided into a plurality of domains, the anomaly detection device and the other anomaly detection device belong to different domains among the plurality of domains, and when transferring or mirroring the frames to the other anomaly detection device, the first frame controller adds, to the frames, identification information for identifying a domain to which the other anomaly detection device belongs, or rewrites identification information included in the frames into the identification information for identifying the domain to which the other anomaly detection device belongs, and transfers or mirrors the frames.

5. The anomaly detection device according to claim 1, further comprising:

a third holder, wherein the second frame controller generates, for each destination stored in each of the one or more frames obtained by the obtainer, log information about transmission and reception of the frame, and stores, into the third holder, the log information generated.

6. The anomaly detection device according to claim 5, further comprising:

an integrated log manager that obtains one or more pieces of the log information from one or more other anomaly detection devices in the vehicle, generates integrated log information by integrating the one or more pieces of the log information obtained and the log information stored in the third holder, and stores, into the third holder, the integrated log information generated.

7. An in-vehicle network system, comprising:

a plurality of anomaly detection devices each of which is the anomaly detection device according to claim 5; and an integrated log management device that obtains one or more pieces of the log information from each of the plurality of anomaly detection devices, generates integrated log information by integrating the one or more pieces of the log information respectively obtained from the plurality of anomaly detection devices, and stores the integrated log information generated.

8. An anomaly detection method for detecting anomaly in a frame flowing through an in-vehicle network system in a vehicle, the anomaly detection method comprising:

obtaining one or more frames in each of which at least a destination is stored;

reading a first rule defining a first anomaly detection rule and a mirroring rule, the first anomaly detection rule indicating that each of the one or more frames that satisfies a first condition is to be determined as being anomalous, the mirroring rule indicating that when a frame included in the one or more frames satisfies a second condition that the destination of the frame is an electronic control unit that performs a predetermined control, the frame is to be transferred or mirrored;

performing an anomaly detection process on each of the one or more frames in accordance with the first anomaly detection rule, and transferring or mirroring the one or more frames in accordance with the mirroring rule that has been read;

reading a second rule defining a second anomaly detection rule indicating that a frame satisfying a third condition is to be determined as being anomalous, the third condition being more specific than the first condition;

performing, in accordance with the second rule that has been read, the anomaly detection process on each of the one or more frames transferred or mirrored; and providing or storing a detection result when an anomalous frame is detected in the anomaly detection process, the detection result indicating the anomalous frame detected, wherein in the obtaining, a plurality of frames including the one or more frames are obtained, the first rule defines a rule indicating that among the plurality of frames obtained, frames accounting for a first proportion are to be transferred or mirrored to a second frame controller included in an anomaly detection device for performing the anomaly detection process, and frames accounting for a second proportion are to be transferred or mirrored to another anomaly detection device in the vehicle, in the transferring or mirroring, the frames accounting for the first proportion are transferred or mirrored to the second frame controller and the frames accounting for the second proportion are transferred or mirrored to the other anomaly detection device in accordance with the first rule, and in the performing, in accordance with the second rule, the anomaly detection process is performed on each of the frames transferred or mirrored that account for the first proportion.

* * * * *